United States Patent
Nozaki et al.

(10) Patent No.: US 7,428,512 B2
(45) Date of Patent: Sep. 23, 2008

(54) INFORMATION DISTRIBUTION SYSTEM, INFORMATION DISTRIBUTION DEVICE, INFORMATION RECEIVING DEVICE, INFORMATION DISTRIBUTION METHOD, INFORMATION DISTRIBUTION PROGRAM, RECORDING MEDIUM RECORDING THE INFORMATION DISTRIBUTION PROGRAM, INFORMATION RECEIVING METHOD, INFORMATION RECEIVING PROGRAM, AND RECORDING MEDIUM RECORDING THE INFORMATION RECEIVING PROGRAM

(75) Inventors: Iwao Nozaki, Wakayama (JP); Yoshinari Marumoto, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 1586 days.

(21) Appl. No.: 09/994,019

(22) Filed: Nov. 27, 2001

(65) Prior Publication Data

US 2002/0036800 A1 Mar. 28, 2002

(30) Foreign Application Priority Data

May 31, 2000 (JP) .............................. 2000-162241

(51) Int. Cl.
*G06F 17/60* (2006.01)

(52) U.S. Cl. .............................. 705/57; 705/58; 705/59; 705/50; 705/51

(58) Field of Classification Search .................. 705/57, 705/58, 59, 50, 51
See application file for complete search history.

(56) References Cited

U.S. PATENT DOCUMENTS

| | | | | |
|---|---|---|---|---|
| 2001/0037359 A1 * | 11/2001 | Mockett et al. | ............. | 709/203 |
| 2002/0023220 A1 * | 2/2002 | Kaplan | ........................ | 713/176 |
| 2002/0174010 A1 * | 11/2002 | Rice | ............................ | 705/14 |

FOREIGN PATENT DOCUMENTS

| JP | 2000-099010 | | 4/2000 |
|---|---|---|---|
| JP | 2001221718 A | * | 8/2001 |

\* cited by examiner

*Primary Examiner*—Pierre Eddy Elisca
(74) *Attorney, Agent, or Firm*—Nixon & Vanderhye PC

(57) ABSTRACT

In the case of modifying available copy count information which is contained in distribution data, the distribution data being distributed from a distribution server and stored in a PC which serves as a receiving device, the PC sends a reuse request to the distribution server. Thereafter, the PC receives a reuse information key from the distribution server so as to rewrite the available copy count of the distribution data based on the reuse information key, thereby making it possible to reuse the distribution data already distributed once.

26 Claims, 13 Drawing Sheets

INFORMATION DISTRIBUTION SYSTEM, INFORMATION DISTRIBUTION DEVICE, INFORMATION RECEIVING DEVICE, INFORMATION DISTRIBUTION METHOD, INFORMATION DISTRIBUTION PROGRAM, RECORDING MEDIUM RECORDING THE INFORMATION DISTRIBUTION PROGRAM, INFORMATION RECEIVING METHOD, INFORMATION RECEIVING PROGRAM, AND RECORDING MEDIUM RECORDING THE INFORMATION RECEIVING PROGRAM

FIELD OF THE INVENTION

The present invention relates to an information distribution system for distributing, via a communications network, distribution data containing contents data (data of copyrighted materials) provided by an information source provider.

BACKGROUND OF THE INVENTION

Recent advances in compression technology for digital music data have made it possible to compress digital music data to be downsized to, for example, about 1/10 of its original size while hardly impairing the sound quality of the original digital music data, and numbers of such compression techniques are proposed. For example, in the case of a tune of about five minutes long which has almost the same sound quality (data bit: 16 bit, sampling frequency: 44.1 kHz) as a CD (Compact Disk), the tune is converted to digital data of about 50 MB in a normal state. However, when adopting a sound compression technique as discussed to convert a data format of the data of the tune, the data can be compressed to the extent of about 5 MB. The data of about this size, for example, can be downloaded to a general home PC (Personal Computer) via the Internet without much difficulty.

However, there arises a problem such that some websites convert music data stored in a commercially available CD into compressed data by utilizing the compression technology as above so as to illegally distribute the compressed data via the WWW (World Wide Web) over the Internet without obtaining the copyright holder's permission to do so.

In other words, since digital data has a characteristic that a quality of data is not impaired after being repeatedly copied, once digital data subject to a copyright is converted to data in a state which can readily be dealt with in a device free from a copy protect facility and capable of making copies, such as a PC, it is then theoretically possible to infinitely and easily make duplicates of the data subject to the copyright. In that case, the right of a copyright holder cannot fully be protected.

Against this problem, there is proposed a data distribution system capable of protecting a copyright in the distribution of music utilizing the Internet. Here, an example of such data distribution system will be explained.

In this data distribution system, distribution-use music data can be downloaded, for example, to a PC, only by paying for that by some payment methods, such as the one utilizing settlement by credit card. This distribution-use music data is an encoded data, which can be reproduced only by using a specific application software program.

Further, the downloaded distribution-use music data is written into a hard disk inside the PC and stored there in such a format that contains information of storage conditions. Thereafter, when it is instructed to reproduce the distribution-use music data, the application software compares the information of storage conditions stored in the distribution-use music data with the actual storage conditions of the distribution-use music data, and the music data is reproduced only when the both conditions are identical. The application software thus functions so as to allow the downloaded distribution-use music data to be reproduced only by the PC to which the data was downloaded.

Furthermore, the distribution-use music data can be copied predetermined limited number of times with respect to a predetermined recording medium. More specifically, the distribution-use music data includes in advance the information of available copy count. For example, when the distribution-use music data is first downloaded, the available copy count is set at three. Further, as to a recording media, a recording medium including an ID (IDentification) authentication facility is used.

Further, when the distribution-use music data in the PC is copied to a recording medium, ID authentication is first performed by the application software within the PC with respect to the recording medium to which the distribution-use music data is to be copied. When the ID authentication is duly performed, the application software transfers data containing the information of the recording medium to the recording medium. In addition, when performing copying with respect to the recording medium, the application software performs a process to subtract one count from the information of the available copy count contained in the distribution-use music data in the PC. Namely, in the case where the available copy count of the downloaded distribution-use music data is three, the data can be copied only to three recording media, and it can no longer be copied to other recording media. Note that, the application software forbids copying data from a copy of the same data, which was previously made in a recording medium, with respect to another recording medium.

Further, the application software enables "recovery" of data by placing a copy of the distribution-use music data in the recording medium back onto the PC. More specifically, in the case where the recording medium storing a copy of the distribution-use music data no longer needs that distribution-use music data, the application software erases the unwanted distribution-use music data from the recording medium and performs a process to add one count to the information of the available copy count of the distribution-use music data within the PC. For example, in the case where three copies of the distribution-use music data are already made in three recording media, respectively, but a further copy of the distribution-use music data should be made in another recording medium, it is possible that a copy of the distribution-use music data in one of the recording media is erased, and one count is thereby added to the information of the available copy count of the distribution-use music data within the PC, thereafter making a copy of the distribution-use music data in the desired recording medium.

With the data distribution system and the application software thereof as discussed, since distribution-use data which is once downloaded into a PC contains the information of storage conditions and the information of available copy count, and the operation of reproducing and/or copying the data is available only when the information is valid, it is possible to solve to some extent the foregoing problem as to protection of a copyright in relation to digital data.

However, the foregoing data distribution system has a problem as shown below.

For example, in the case where one desires to use distribution-use music data, which was once downloaded by paying for that and stored in a PC, in a different PC, it is not possible by simply copying a file from one PC to the other that the information of storage conditions in the different PC to which the data is to be copied coincides with the information of storage conditions contained in the distribution-use music data. As a result, reproducing and/or copying the distribution-use music data cannot be performed by the foregoing data distribution system and the application software thereof.

Consequently, in the case where a user desires to use (reproduce/copy) distribution-use music data in a PC which is other than a PC which was already used in downloading, the user should pay again for downloading the same distribution-use music data to the other PC. Namely, the user should pay twice and spend twice the time for downloading the same distribution-use music data.

Further, a problem also arises when, for example, something causes breakage in a program data of the OS (Operating System) in the PC, to which distribution-use music data was downloaded, and the OS should be reinstalled so as to recover the program data. In that case, a difference occurs between information in a storage state which is recorded in the distribution-use music data and information in a storage state in a PC after reinstallation. As a result, the distribution-use music data becomes unable to operate reproduction and copying. More specifically, in the case where the OS is reinstalled in the PC, the user should pay again for downloading the same distribution-use music data.

Further, the following is likely to happen: a user makes duplicates of distribution-use music data which was downloaded to the PC in recording media, where the number of the recording media (three, for example) is the same as the available copy counts; thereafter, the user desires to make a new copy of the data in a recording medium without deleting the copied data stored in the foregoing recording media. In that case, the user should pay again for downloading the same distribution-use music data and make a duplicate of the newly downloaded distribution-use music data in the other recording medium. Namely, the user should pay twice and spend twice the time for downloading the same data. Moreover, two copies of the distribution-use music data of the identical content are recorded in the same hard disk of the PC after all. This is no more than the useless occupation of the capacity of the PC hard disk.

As discussed, the foregoing data distribution system has a problem in terms of the user's convenience, though it is achieving a quite good level of copyright protection. This problem obstructs the spread of the foregoing data distribution system.

The present invention is made in order to solve the foregoing problems, and an object of which is to provide an information distribution system capable of distributing, via a communications network, data for distribution which contains contents data provided from an information source provider and of reusing the data for distribution which was distributed once.

SUMMARY OF THE INVENTION

In order to solve the foregoing problems, an information distribution system according to the present invention which distributes contents data via a communications network, the contents data being provided by an information source provider, includes: a distribution device for distributing distribution data containing the contents data; and a receiving device for receiving and storing the distribution data, wherein: the distribution data further contains use limitation information of the distribution data, and the receiving device rewrites the use limitation information of the stored distribution data upon receipt of permission by the distribution device.

With this arrangement, the distribution data containing the contents data that was provided by the information source provider is distributed over the communications network by the distribution device, and the distribution data is received and stored by the receiving device. Further, the distribution data further contains the use limitation information thereof, and the use limitation information can be rewritten by the receiving device when permitted by the distribution device.

In order to modify use limitation information of distribution data which is stored in a receiving device, it was conventionally required to receive, again, the same distribution data having different use limitation information from a distribution device. In contrast, in the foregoing arrangement, in order to modify the use limitation information of the distribution data stored in the receiving device, it is required to simply obtain permission to do so from the distribution device, thereby making it possible to modify the use limitation information. This enables modification of the use limitation information of the distribution data stored in the receiving device without receiving, again, the distribution data containing contents data which has a relatively large data size.

This greatly shortens time for data distribution and saves data storage capacitance in the receiving device.

Additional objects, features, and strengths of the present invention will be made clear by the description below. Further, the advantages of the present invention will be evident from the following explanation in reference to the drawings.

DESCRIPTION OF THE EMBODIMENTS

First Embodiment

The following will explain one embodiment of the present invention with reference to FIGS. 1 through 10.

Figure 2:
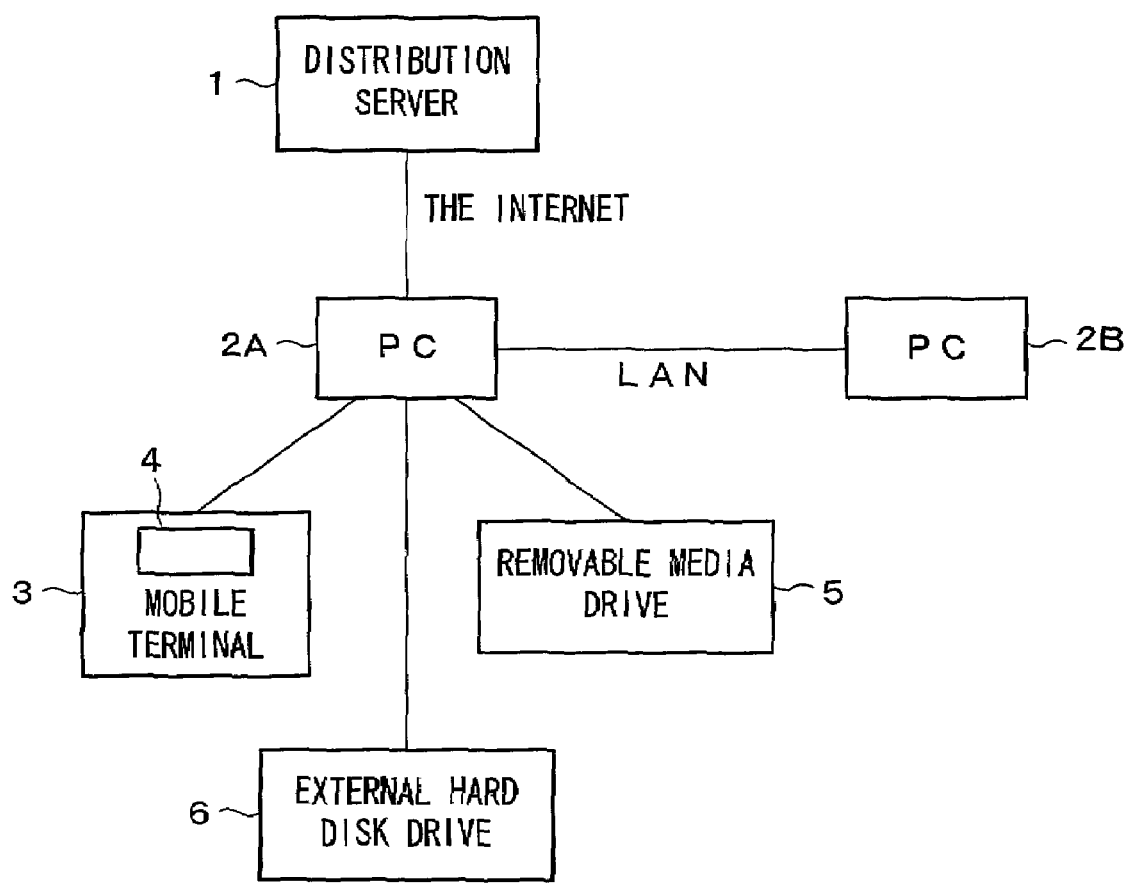
FIG. 2 is a block diagram schematically showing the information distribution system.

FIG. 2 is a block diagram schematically showing an information distribution system according to one embodiment of the present invention. As shown in FIG. 2, the information distribution system is made up of a distribution server (distribution device, information distribution device) 1 which is a distribution source of distribution-use music data, and a PC (receiving device, information receiving device) 2A which is connected to the Internet in a state that can log in the distribution server 1. Note that, in reality, numerous PCs are connected to the Internet. The present information distribution system is made up of the distribution server 1 and the plurality of PCs. Only a connection state with regard to one of the plurality of PCs is shown in FIG. 2. Further, the present information distribution system may have an arrangement in which a plurality of the distribution servers 1 are provided.

Here, the form of connection between the PC 2A and the Internet is not particularly limited to the foregoing, and it is possible to adopt other forms of connection, such as network connection to connect PCs via a LAN of a corporation, university or the like connected to the Internet, and terminal connection to connect PCs to a provider connected to the Internet, via an analog telephone line, an ISDN (Integrated Service Digital Network), a telephone line, leased lines such as a cable TV, a wired radio system and the like.

Further, connection between the distribution server 1 and the PC 2A is not established restrictively via the Internet, and it is possible to utilize, for example, a PC communications service network or the like whose communications network is entirely managed by a specific managing company.

The PC 2A is equated with what is called a personal computer in which, for example, an OS is installed in a hard disk, and based on this OS are performed various processes. Note that, an arrangement of the PC 2A will be discussed in detail later.

Further, to the PC 2A are connected a mobile terminal 3, a removable media drive 5, an external hard disk drive 6 and others. The mobile terminal 3 is a portable device capable of replaying the distribution-use music data and has an arrangement in which a memory device 4 which can store the distribution-use music data is loaded. Namely, data which is transmitted from the PC 2A to the mobile terminal 3 is stored in the memory device 4. The form of connection between the mobile terminal 3 and the PC 2A may be, though not particularly limited, serial connection, USB (Universal Serial Bus) connection or others, for example.

Note that, the memory device 4 is made up of a recording medium having an ID authentication facility for the memory device 4. Such recording media to be used for the memory device 4 include a recording medium provided with such an IC (Integrated Circuit) that can perform ID authentication with respect to flash memory. In the present specification, this recording medium having the ID authentication facility therefor is referred to as a "recording medium capable of ID authentication".

The removable media drive 5 is a device for recording data transmitted from the PC in various removable media and equated with, for example, a flexible disk drive, an MO drive, a CD-R drive or the like. Note that, the removable media drive 5 may be either externally provided with respect to the PC 2A or installed in the PC 2A. The form of connection between the removable media drive 5 and the PC 2A may be, though not particularly limited, USB connection, SCSI (Small Computer System Interface) connection, IEEE 1394 connection or the like, for example.

Further, the external hard disk drive 6 has an arrangement to be adopted in the case where a hard disk is externally provided in addition to a hard disk installed in the PC 2A. The form of connection between the external hard disk drive 6 and the PC 2A may be, though not particularly limited, USB connection, SCSI connection, IEEE 1394 connection or the like, for example.

Further, as shown in FIG. 2, the PC 2A may be connected to a PC 2B, which is different from the PC 2A, via a LAN according to the Ethernet (a registered trademark) or the like. The PC 2B is equated with a personal computer like the PC 2A.

Figure 3:
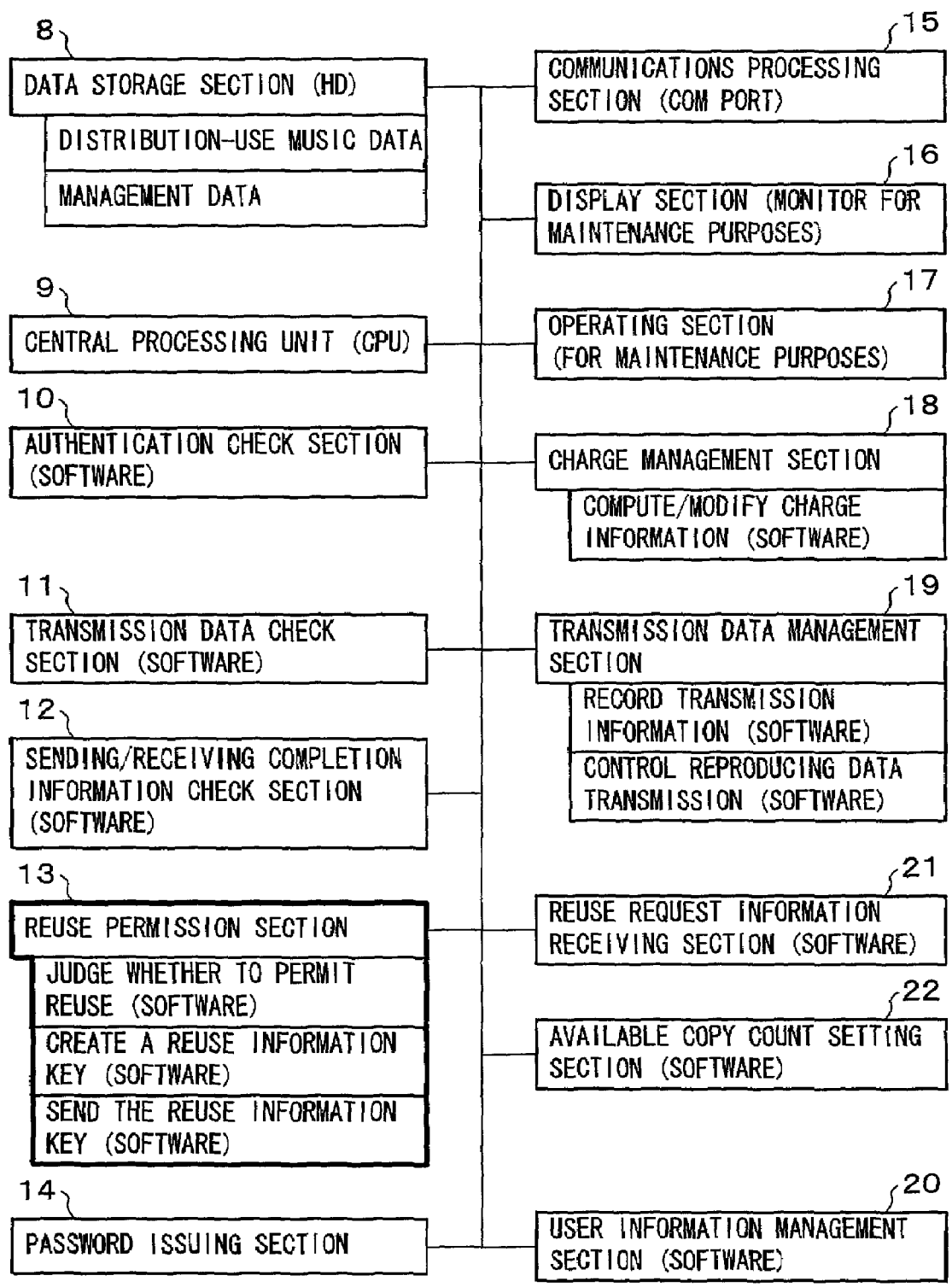
FIG. 3 is a block diagram schematically showing an arrangement of a distribution server included in the information distribution system.

Next, the following will explain an arrangement of the distribution server 1. FIG. 3 is a block diagram schematically showing an arrangement of the distribution server 1. Note that, the arrangement shown in FIG. 3 is an example in which the distribution server 1 is made up of a server which is constructed having a PC as a basic configuration. As shown in FIG. 3, the distribution server 1 includes a data storage section 8, a central processing section 9, an authentication check section 10, a transmission data check section 11, a sending/receiving completion information check section 12, a reuse permission section 13, a password issuing section 14, a communications processing section 15, a display section 16, an operating section 17, a charge management section 18, a transmission data management section 19, a user information management section 20, a reuse request information receiving section 21, and an available copy count setting section 22. Note that, FIG. 3 shows these components as if they are all connected in the same manner. In reality, however, some portions are connected in terms of hardware via various busses, interfaces and the like, and the others are connected in terms of software by association made over control/processing programs.

The data storage section 8 is made up of storage means, such as a hard disk device, for example. The data storage section 8 stores distribution-use music data which is a target for distribution and/or various management data related to distribution. Note that, within this hard disk device or a different hard disk device are stored the OS, various programs, data and the like that are necessary for the operation of the distribution server 1.

The central processing section 9 is made up of a computing device, such as the CPU (Central Processing Unit). The central processing section 9 performs various computations in the distribution server. Note that, though not shown, the central processing section 9 has a RAM (Random Access memory) that is necessary for performing various computations.

The communications processing section 15 is arranged to be a network interface with a computer which is provided outside the distribution server 1. A specific COM port of the computer making up the distribution server 1 is allotted as the communications processing section 15. Note that, the type and form of the network interface are not particularly limited, and there is adopted, for example, the Ethernet, an FDDI (Fiber Distributed Data Interface), the ISDN (Integrated Services Digital Network), an ATM (Asynchronous Transfer Mode) or the like.

The display section 16 is made up of any of various display monitors, such as a CRT (Cathode Ray Tube), an LCD (Liquid Crystal Display) and the like. Further, the operating section 17 is made up of input devices, such as a keyboard and/or a mouse. The display section 16 and the operating section 17 perform maintenance, such as checking the operation state of the distribution server 1, changing processing operation and the like.

The data storage section 8, the central processing section 9, the communications processing section 15, the display section 16 and the operating section 17 thus explained are blocks indicative of the hardware arrangement of the distribution server 1. Further, the authentication check section 10, the transmission data check section 11, the sending/receiving completion information check section 12, the reuse permission section 13, the password issuing section 14, the charge management section 18, the transmission data management section 19, the user information management section 20, the reuse request information receiving section 21 and the available copy count setting section 22 that will be shown below are blocks indicative of the software arrangement of the distribution server 1.

The authentication check section 10 is a block to perform authentication check with respect to a PC from which a request for distribution of distribution-use music data is transmitted to the distribution server 1. When the PC requests access to the distribution server 1, the authentication check section 10 checks the ID and password of the PC. Only when the PC passes the authentication check, the distribution of the distribution-use music data is permitted.

The transmission data check section 11 is a block to check if data information including specific distribution-use music data, distribution of which is requested by the PC, available copy count information of the distribution-use music data and the like coincides with data information stored in the distribution server 1. In other words, the transmission data check section 11 is a block to check whether or not the distribution server 1 can appropriately respond to the request for distribution sent from the PC. In the case where the transmission data check section 11 judges that distribution cannot be permitted, the judgment is transmitted to the PC.

The sending/receiving completion information check section 12 is a block to check whether or not distribution-use music data was sent to the PC without troubles after the distribution server 1 sent the distribution-use music data to the PC. More specifically, the sending/receiving completion information check section 12 checks whether or not sending/receiving was done successfully by checking whether or not a signal indicating that the PC finished receiving the distribution-use music data has been received.

The password issuing section 14 is a block to issue a password to each PC subscribing to distribution-use music data distribution. A system of the password to be adopted here may be a system which allows the password to be changed by request of the PC or a system which allows the password to be changed by a decision made by the distribution server 1.

The user information management section 20 is a block to manage various information on each PC subscribing to distribution-use music data distribution. The various information here includes not only the ID and password but also the status and history of data distribution, the status of payment of a charge, and the like regarding each PC.

The charge management section 18 is a block to manage charge information of distribution-use music data, which includes, for example, charge information in the case of distributing the distribution-use music data, change information in the case of distributing only header portion modification data, charge information based on available copy count information, and the like.

The transmission data management section 19 is a block to perform, when transmitting the distribution-use music data to the PC, recording of information on the transmission as a log and control of the transmission of the distribution-use music data.

The reuse request information receiving section 21 is a block to receive from the PC a request for distribution of a reuse information key. Further, the reuse permission section 13 is a block to judge whether to permit reuse of the distribution-use music data based on the content of reuse request data received by the reuse request information receiving section 21, create a reuse information key, and send the reuse information key thus created to the PC that sent the reuse request data. The process performed in the reuse permission section 13 will be discussed later.

The available copy count setting section 22 is a block to set available copy count information of distribution-use music data based on the desired available copy count of the distribution-use music data, distribution of which has been requested by the PC. More specifically, data containing the available copy count information thus set by the available copy count setting section 22 is sent to the PC, and the PC makes a duplicate of the data based on limitations imposed by the available copy count information.

Figure 4:
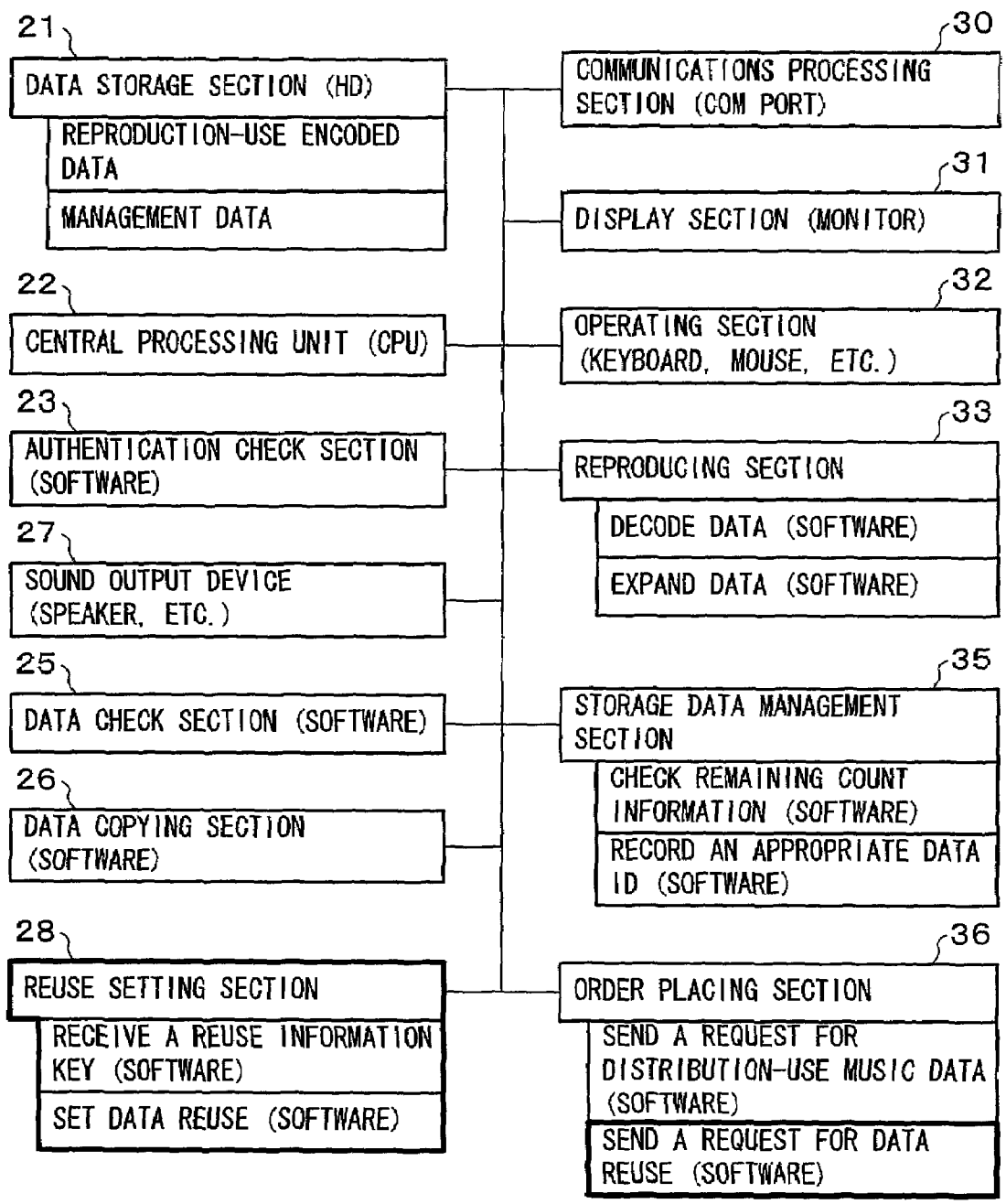
FIG. 4 is a block diagram schematically showing an arrangement of the PC.

Next, the following will explain in detail an arrangement of the PC 2A. FIG. 4 is a block diagram schematically showing an arrangement of the PC 2A. As shown in FIG. 4, the PC 2A is provided with a data storage section 21, a central processing section 22, an authentication check section 23, a data check section 25, a data copying section 26, a sound output device 27, a reuse setting section 28, a communications processing section 30, a display section 31, an operating section 32, a reproducing section 33, a storage data management section 35, and an order placing section 36. Note that, FIG. 4 shows these components as if they are all connected in the same manner. In reality, however, some portions are connected in terms of hardware via various busses, interfaces and the like, and the others are connected in terms of software by association made over control/processing programs.

The data storage section 21 is made up of storage means, such as a hard disk device installed in the PC 2A, for example. The data storage section 21 stores distribution-use music data which is received from the distribution server 1 and/or various management data related to receiving, replaying and copying. Note that, within this hard disk device are stored the OS, various programs, data and the like that are necessary for the operation of the PC 2A.

The central processing section 22 is made up of a computing device, such as the CPU. The central processing section 22 performs various computations in the PC 2A. Note that, though not shown, the central processing section 22 has a RAM (Random Access memory) that is necessary for performing various computations.

The communications processing section 30 is arranged to be a network interface with a computer which is provided outside the PC 2A. A specific COM port of the computer making up the PC 2A is allotted as the communications processing section 30.

The display section 31 is made up of any of various display monitors, such as a CRT, an LCD and the like. Further, the operating section 32 is made up of input devices, such as a keyboard and/or a mouse.

The sound output device 27 is made up of an amplifier, a speaker and the like. The sound output device 27 is a block to output sound when the received distribution-use music data is replayed.

The data storage section 21, the central processing section 22, the communications processing section 30, the display section 31, the operating section 32 and the sound input device 27 thus explained are blocks indicative of the hardware arrangement of the PC 2A. Further, the authentication check section 23, the data check section 25, the data copying section 26, the sound output section 27, the reuse setting section 28, the communications processing section 30, the display section 31, the operating section 32, the reproducing section 33, the storage data management section 35 and the order placing section 36 that will be shown below are blocks indicative of the software arrangement of the PC 2A.

The data copying section 26 is a block to copy distribution-use music data which is stored in the data storage section 21, that is, the hard disk of the PC 2A to various recording media connected to the PC 2A. For example, FIG. 2 shows examples of the recording media that can be the destination of the copied data, as follows: the memory device 4 installed in the mobile terminal 3, various removable media of the removable media drive 5, the hard disk of the external hard disk drive 6, the hard disk of the PC 2B connected via the LAN, and the like.

The authentication check section 23 is a block to send a request for distribution of specific distribution-use music data to the distribution server 1 and authenticate data distribution. When requesting for distribution, the authentication check section 23 sends the ID and password of the PC 2A, authentication of which is then performed by the distribution server 1. Only when the ID and password of the PC 2A passed the authentication check, the distribution server 1 sends the requested distribution-use music data to the PC 2A.

The data check section 25 is a block to check a target distribution-use music data when it is copied and/or reproduced. For example, when a user of the PC 2A attempts to make a duplicate of a specific distribution-use music data stored in the PC 2A with respect to a specific recording medium, the data check section 25 checks the available copy count information of the distribution-use music data, thereby checking whether to permit the copying. Here, in the case where it is judged that the copying cannot be permitted, in other words, when it is judged that the available copy count is 0, the user is notified via the display section, etc., of the judgment that the data cannot be copied.

Further, in the case where the user of the PC 2A attempts to reproduce the specific distribution-use music data stored in the PC 2A, the data check section 25 compares information on a storage state which is recorded in the distribution-use music data with an actual storage state. Only when the result of comparison shows that the both states are identical, the data check section 25 permits reproducing the data.

The reproducing section 33 is a block to decode encrypted data which is recorded in a data section of the distribution-use music data that is the target of reproduction, when the user attempts to reproduce the distribution-use music data in storage by the PC 2A. Further, the reproducing section 33 simultaneously decompresses/expands (decodes) the reproduction-target distribution-use music data when it is compressed. This converts the format of the reproduction-target data to a reproducible data format, thereby performing reproducing.

The storage data management section 35 is a block to check available copy count information of distribution-use music data stored in the PC 2A, and perform recording and management of the available copy count information together with the ID of each distribution-use music data. The storage data management section 35 enables the grasp of the available copy count of each distribution-use music data stored in the PC 2A.

The order placing section 36 is a block to send a request for distribution-use music data and a request for data reuse with respect to the distribution server 1. Sending the request for distribution-use music data is, in other words, to send a request for distribution of the distribution-use music data to the distribution server 1 when the user gives an instruction to newly download the distribution-use music data from the distribution server 1. Further, sending the request for data reuse is, in other words, to send a request for distribution of a reuse information key for the distribution-use music data with respect to the distribution server 1 when the user gives an instruction that the distribution-use music data stored in the PC 2A should be reused.

The reuse setting section 28 is a block to receive the reuse information key with respect to the distribution-use music data stored in the PC 2A from the distribution server 1 and rewrite data within the distribution-use music data based on the reuse information key thus received.

Figure 5:
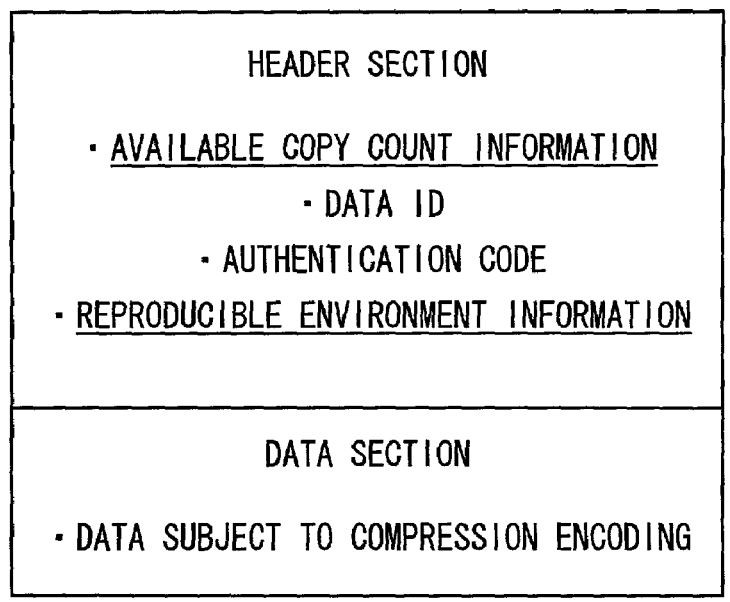
FIG. 5 is an explanatory view schematically showing an arrangement of distribution-use music data.

Next, the following will explain a structure of distribution-use music data which is transmitted from the distribution server 1 to the PC. FIG. 5 is an explanatory view schematically showing an arrangement of the distribution-use music data. As shown in FIG. 5, the distribution-use music data is made up of a header section and a data section.

The header section has a record of available copy count information (producible count information), a data ID, an authentication code and reproducible environment information (use environment information). The available copy count information indicates the permissible maximum copy count of music data based on the distribution-use music data when the music data is copied to the above-mentioned recording medium capable of ID authentication. Specifically, the available copy count information is attached so as to prevent, by limiting the copy count, a risk of allowing a newly downloaded distribution-use music data to be copied infinitely. In addition, the available copy count information is rewritten in such a manner that the available copy count decreases one by one whenever copying is performed. When the available copy count reaches zero, the available copy count information functions as forbidding information whereby copying is forbidden.

The data ID indicates an ID which is given exclusively to the distribution-use music data. The data ID indicates the contents of data in the distribution-use music data while, even though the contents of data is the same, changing into a different ID according to a timing (time) at which the data is distributed from the distribution server 1.

Further, the authentication code shows that the data has been distributed from a specific distribution server 1.

The reproducible environment information defines an environment in which music data contained in the distribution-use music data is reproduced. The reproducible environment information is written, when the data is downloaded and stored in the PC 2A, in accordance with a storage condition of the data.

The data section is made up of contents data which is worth being purchased by a user. The contents data in the present embodiment is digital music data. The digital music data is coded with encryption lest one should easily analyze its contents. Further, the digital music data like this generally has a large data size and therefore is coded with compression as required.

Figure 6:
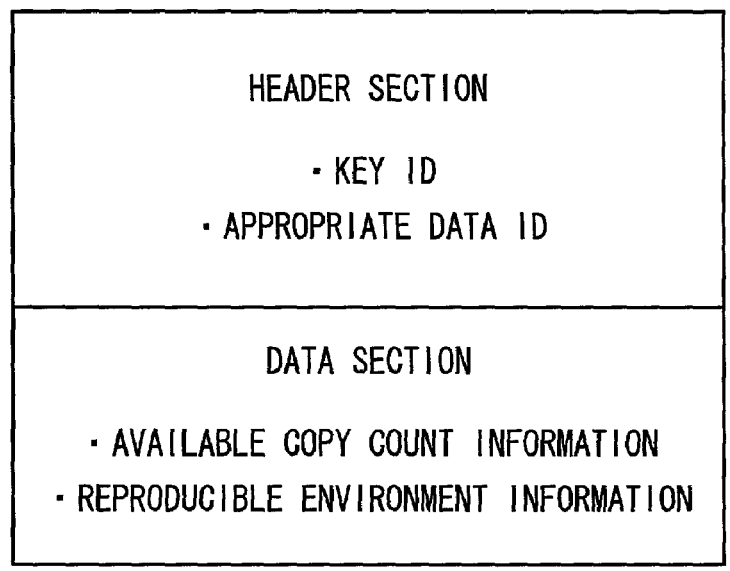
FIG. 6 is an explanatory view schematically showing an arrangement of the reuse information key.
Figure 7:
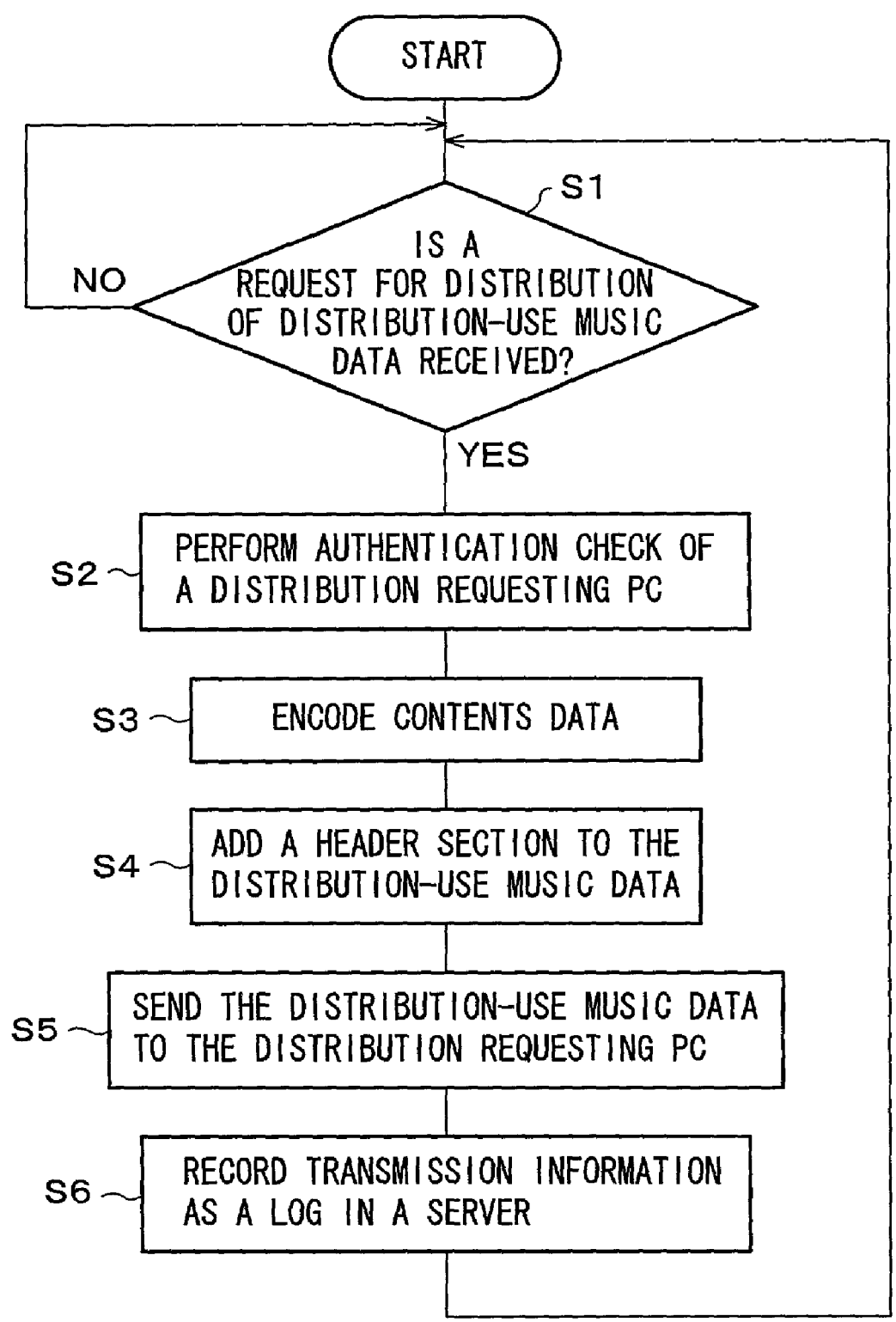
FIG. 7 is a flow chart showing the flow of processes in the case where the distribution server distributes the distribution-use music data.

Next, the following will explain a structure of a reuse information key to be transmitted from the distribution server 1 to a PC. FIG. 6 is an explanatory view schematically showing an arrangement of the reuse information key. As shown in FIG. 6, the reuse information key is made up of a header section and a data section.

The header section has a record of a key ID and an applicable data ID. The key ID is information showing the ID of the reuse information key. The applicable data ID is information showing the ID of distribution-use music data for reuse.

The data section has a record of available copy count information and reproducible environment information. The available copy count information shows the maximum permissible count of copies of music data contained in the distribution-use music data for reuse to be made in the recording medium capable of ID authentication. The available copy count information is set when a user sends a request for reuse to the distribution server 1. The user is required to pay an appropriate charge depending on the permitted copy count in the available copy count information. Namely, the user can obtain a reuse information key corresponding to the desired available copy count by paying the charge as required.

The reproducible environment information defines an environment in which music data contained in the distribution-use music data is reproduced. The reproducible environment information is written, when the data is downloaded and stored in the PC 2A, in accordance with a storage condition of the data.

Note that, the structure of distribution-use music data is not limited to that of the distribution-use music data shown in FIG. 5 that is made up of the header and data sections separately, the header section having a record of the available copy count information, the reproducible environment information and the like and the data section having a record of the contents data.

For example, header information can be made such data that is recorded in the data section, by using an electronic watermark technique shown below. A distribution-use music data using the electronic watermark technique has an arrangement in which header information is recorded while being dispersed in a plurality of positions in contents data which is free from encryption and compression, to an extent which does not disturb reproduction of the contents data.

In the case of requesting reuse of distribution-use music data using the electronic watermark technique as above, the distribution-use music data in an encrypted or compressed state is decompressed (decoded), thereafter taking watermark information out of contents data, thereby extracting header information from a header section and requesting reuse based on the extracted header information. When thus sending the request for reuse, information on the contents data of the distribution-use music data is sent together. This information shows in what manner the contents data of the distribution-use music data has been modified as a result of insertion of watermark data, which corresponds to the header information, to the contents data by replacing the previous data.

In the case of receiving the request for reuse as described, and when creating a reuse information key as shown in FIG. 6, a distribution server takes into account information on the location in the contents data of the distribution-use music data, where replacement of the watermark data was performed, thereby causing the reuse information key to contain a lost portion of the contents data.

A PC which received the reuse information key as described inserts to the distribution-use music data corresponding to the received reuse information key the lost portion of the contents data contained in the reuse information key by replacing the previous data based on the header information, thereby restoring the contents data with respect to the distribution-use music data. This, even when the reuse is performed twice or more, prevents the contents data from deteriorating due to insertion and replacement of the watermark data twice or more. Note that, the location of the contents data to perform insertion/replacement of the header information varies whenever performing electronic watermarking.

Thereafter, such header information as available copy count information, reproducible environment information and the like contained in the reuse information key is inserted to a plurality of new positions in the contents data.

Since the header information is thus contained in the distribution-use music data by electronic watermarking, it is extremely difficult for a third party to check the header information in the distribution-use music data, thereby preventing unauthorized rewriting of header information.

Next, the following will explain the flow of a process in the distribution server 1 shown in FIG. 3. Explained first with reference to a flow chart of FIG. 7 will be the flow of steps in the process whereby the distribution server 1 distributes distribution-use music data.

In Step 1 (hereinafter referred to as "S1"; this applies to all the other Steps), a judgment is made as to whether or not a request for distributing distribution-use music data was received via a COM port of the communications processing section 15. When the result of the judgment shows that the request for distributing distribution-use music data was received ('YES' in S1), S2 and subsequent Steps are carried out. On the other hand, in the case where the request for distributing distribution-use music data was not received ('NO' in S1), the process of S1 is repeated, i.e., this step represents a stand-by state with respect to the request for distributing distribution-use music data.

In the case of receiving the request for distributing distribution-use music data, an authentication check with respect to a user operating a PC from which the request for distribution was sent is performed by the authentication check section 10 (S2). The authentication check is performed to check whether or not the user of the PC is identical with a user subscribing to distribution-use music data distribution, based on an ID and a password sent from the PC requesting distribution. In the case where authentication is not performed in a normal state in this step, a message of 'distribution not allowed' is sent to the PC, thereby aborting the distribution process.

When authentication is finished in S2, contents data which corresponds to the music data, distribution of which is requested, is encoded (S3), thereby creating a data section of the distribution data. Note that, when the contents data stored in the distribution server 1 is already encoded, this step is not required.

Next, in accordance with available copy count of the data, distribution of which is requested by the PC, available copy count information in the distribution-use music data is set by the available copy count setting section 22, thereby adding a header section containing the available copy count information to the distribution-use music data (S4).

Further, the distribution-use music data which is made up of the header section and a data section is sent to the PC requesting distribution, by the distribution data transmission control of the transmission data management section 19 (S5). Further, upon completion of transmission, in the distribution server 1 are recorded transmission information, such as the data type, programmed available copy count information, destination PC and the like as a log (S6). The distribution process is completed by carrying out Steps up to S6. Thereafter, the sequence goes back to S1, i.e., the stand-by state with respect to a request for distribution.

Figure 8:
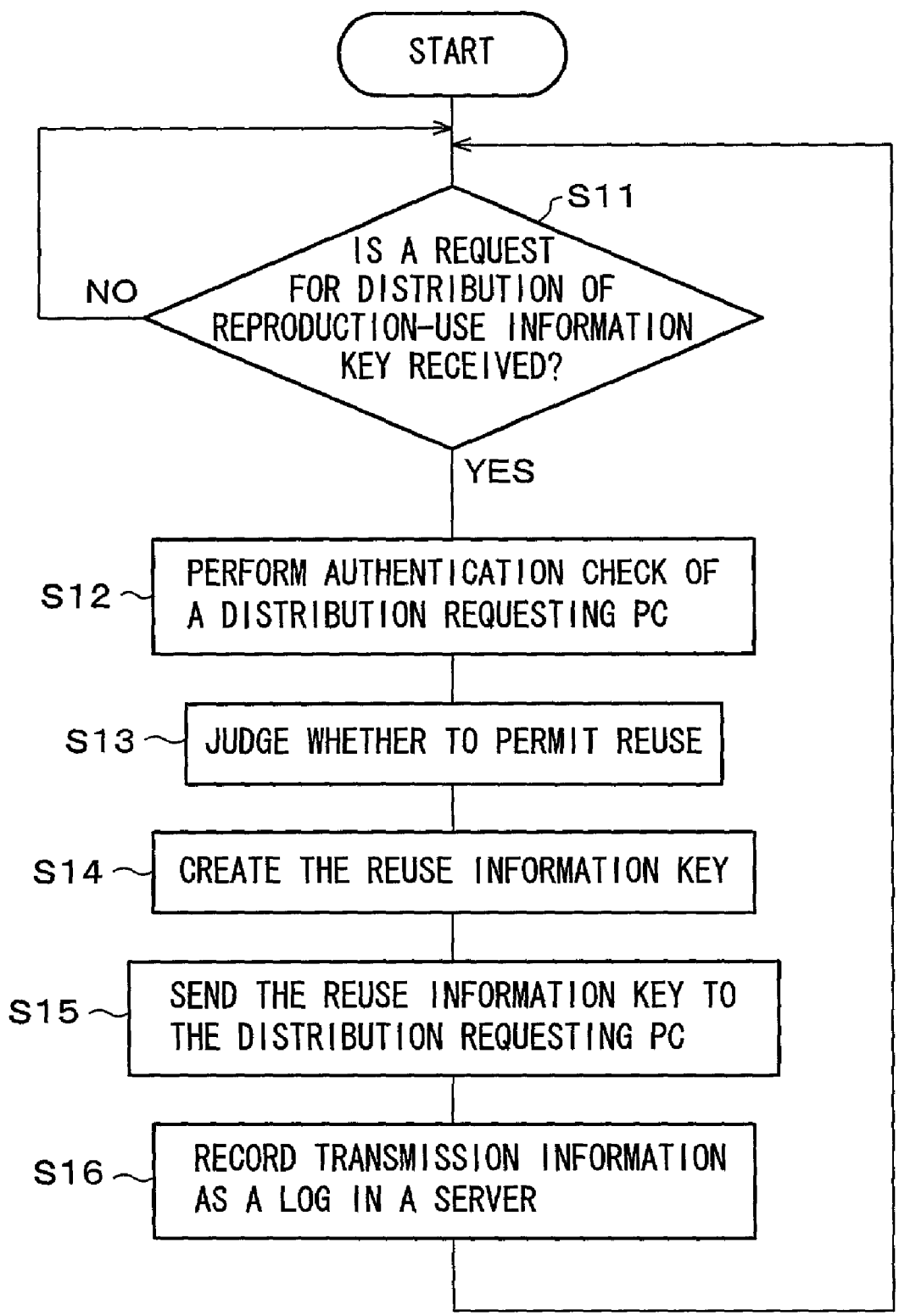
FIG. 8 is a flow chart showing the flow of processes in the case where the distribution server distributes the reuse information key.

Next, the flow of steps in the process whereby the distribution server 1 distributes a reuse information key will be explained with reference to a flow chart of FIG. 8.

In Step 11 (S11), a judgment is made as to whether or not a request for distributing a reuse information key was received by the reuse request information receiving section 21 via a COM port of the communications processing section 15. When the result of the judgment shows that the request for distributing the reuse information key was received ('YES' in S11), S12 and subsequent Steps are carried out. On the other hand, in the case where the request for distributing the reuse information key was not received ('NO' in S11), the process of S11 is repeated, i.e., this step represents a stand-by state with respect to a request for distributing the reuse information key.

In the case of receiving a request for distributing the reuse information key, an authentication check with respect to a PC from which the request for distribution was sent is performed by the authentication check section 10 (S12). The authentication check is performed to check whether or not the PC is identical with a PC subscribing to reuse information key distribution, based on an ID and a password sent from the PC requesting distribution. In the case where authentication is not performed in a normal state in this step, a message of 'distribution not allowed' is sent to the PC, thereby aborting the distribution process.

When authentication is finished in S12, then the reuse permission section 13 judges whether to give permission to reuse the desired distribution-use music data with respect to the PC (S13). The judgment of whether to permit reuse will be discussed in detail later.

When reuse is permitted in S13, the reuse permission section 13 further creates a reuse information key (S14) The reuse information key, as discussed, has an arrangement shown in FIG. 6, in which the requested available copy count is recorded as available copy count information. Note that, reproducible environment information in FIG. 6 is used, when the reuse information key is downloaded to an applicable PC, and the header section of distribution-use music data stored in the applicable PC is rewritten, to rewrite the reproducible environment information of the distribution-use music data.

Further, the reuse information key thus created is sent to the PC requesting distribution by the reuse information key transmission control of the reuse permission section 13 (S15). Further, upon completion of transmission, in the distribution server 1 are recorded transmission information, such as the data type, programmed available copy count information, destination PC and the like as a log (S16). The distribution process is completed by carrying out Steps up to S16. Thereafter, the sequence goes back to S11, i.e., the stand-by state with respect to a request for distribution.

Next, the following will explain the judgment of whether to permit reuse in the above step S13. The reuse permission judgment here is made based on the conditions of a distributor and the conditions of a receiver, respectively.

The conditions of the distributor includes the following ①, ② and others:
① a distribution server should be capable of issuing a reuse information key with respect to distribution-use music data, reuse of which is requested; and
② the available copy count required in the request for reuse should be in a range of available copy counts which can be set by the distribution server meeting the condition ①.

The condition ① is valid when, for example, a plurality of distribution servers are provided on a network, and each distribution server is given distribution limitations by, for example, a contents data provider and/or a copyright manager. In that case, not all the distribution servers distributing distribution-use music data but only those authorized by authorities (person/institution holding the power to authorize) can permit reuse. Note that, this condition can alternatively be set so as to be different for each distribution-use music data which is prepared by the distribution server. Namely, it may be set so that a certain distribution server can, on one hand, permit reuse of specific distribution-use music data but, on the other hand, cannot permit reuse of other distribution-use music data.

The above condition ② is valid when, for example, a plurality of distribution servers are provided on a network as with the condition ①, and each distribution server is given the maximum available copy count under reuse permission, that is set by, for example, a contents data provider and/or a copyright manager.

For example, it may be set such that a certain distribution server A, on one hand, is given a limitation of the maxim available copy count N, and a distribution server B, on the other hand, is given a limitation of the maximum available copy count M (M>N). Here, in the case where the desired available copy count in a request for reuse is L (N<L<M), the distribution server A, on one hand, cannot receive the request, but the distribution server B, on the other hand, can receive the request.

In the case where the conditions of the distributor as described are not satisfied, with respect to a reuse requesting side is transmitted information indicating that the distribution server cannot issue the reuse information key and information indicating the reasons therefor. Alternatively, it may be set such that the same request for reuse is transferred to a different distribution server which meets the conditions of the distributor, and the transfer-destination distribution server distributes the reuse information key to the reuse requesting side.

The conditions of the receiver includes the following ①, ②, ③ and others:
① the desired available copy count should be in a permissible range of available copy counts for a reuse requesting user, which range is determined based on the user's ID authenticated by the authentication check;
② the total amount of pending payments by the user should be in a range according to standard conditions; and
③ in the case of a user paying by a pre-paid system, the balance of the user's pre-paid account should suffice for a payment required for reuse.

The condition ① is valid, for example, when the content of contracts with users vary in terms of a basic charge and/or a charging system or in terms of the maximum available copy count which is determined in accordance with payment status, a contract term, and the like.

The condition ② is valid when it is set, for example, that reuse permission is not given to a user whose pending payment is markedly large.

The condition ③ is valid when it is set, for example, that reuse permission is not given to a user whose pre-paid account shows the insufficient balance.

In the case where the foregoing conditions of the receiver are not satisfied, with respect to the reuse requesting side is transmitted information indicating that the distribution server in question cannot issue a reuse information key and information indicating the reasons therefor.

Next, the following will explain the flow of processes in the PC 2A shown in FIG. 4. First of all, the flow of processes in the PC 2A when receiving distribution-use music data will be explained with reference to a flow chart of FIG. 9.

First, in S21, a user of the PC 2A gives an instruction to distribute specific distribution-use music data which the user desires to have. Thereafter, the order placing section 36 sends a request for distributing the distribution-use music data to the distribution server 1 (S22). Together with the request for distribution is sent a request regarding available copy count. At that time, the authentication check section 23 sends the ID and password of the PC 2A, thereby performing authentication.

Once the request for distribution is received, after carrying out charging, the distribution server 1 sends to the PC 2A the distribution-use music data in which the desired available copy count information is recorded (S23). Accordingly, distribution-use music data which is equated to the data desired to be reproduced is stored in the PC 2A.

Furthermore, depending on a storage condition of the distribution-use music data, reproducible environment information is written into a header section of the distribution-use music data (S24). Note that, another possible arrangement is that the reproducible environment information is written in the header section when first reproduction after downloading is performed. Further, other possible arrangement is that the reproducible environment information is written at the side of the distribution server 1 before downloading.

Thereafter, in the case where the user gives an instruction for reproduction, the reproducing process section 33 decodes the data section of the distribution-use music data, thereby reproducing contents data (S25). When reproducing, appropriate music is outputted from the sound output device 27.

Figure 1:
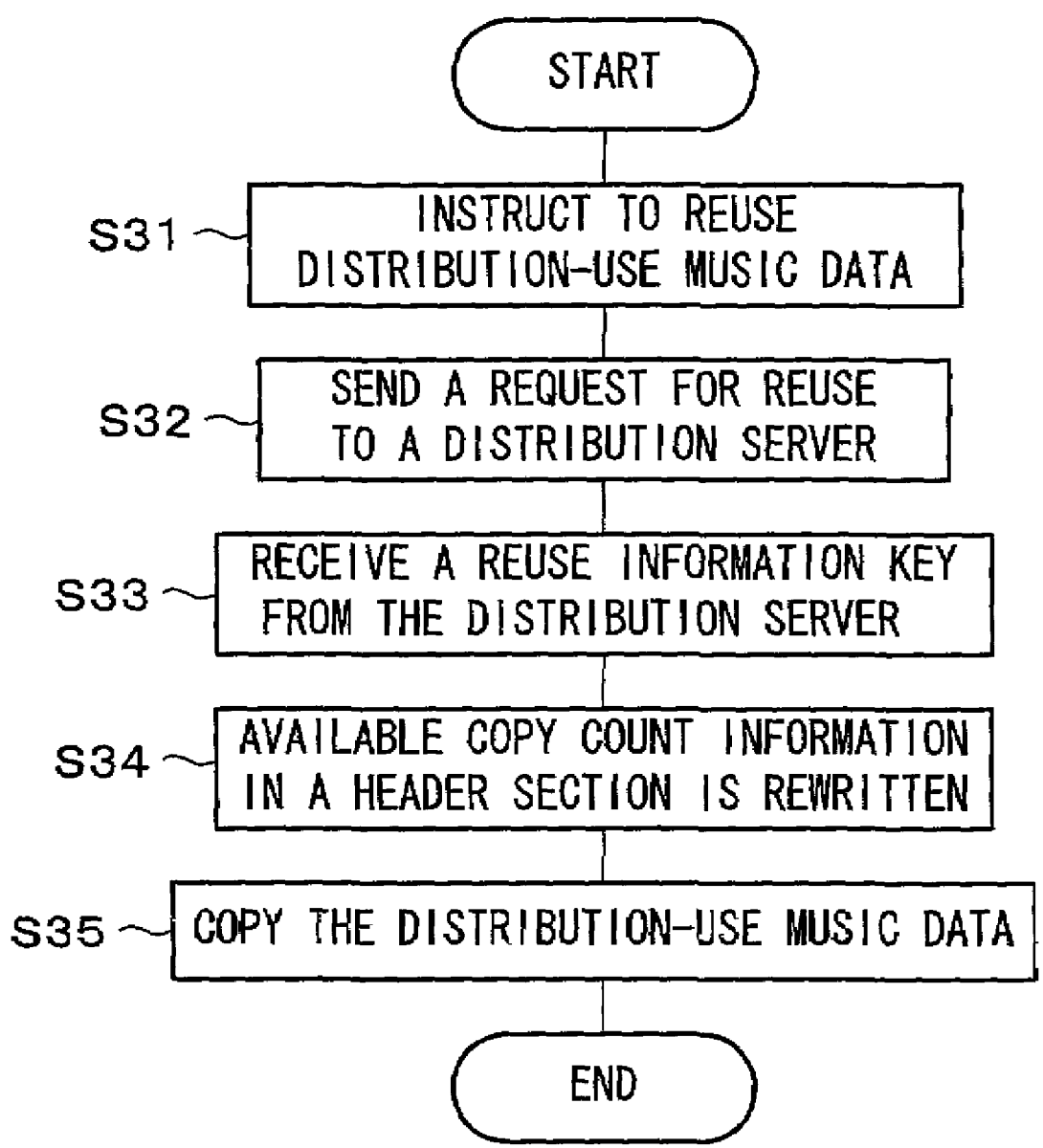
FIG. 1 is a flow chart showing the flow of processes in the case where a reuse information key is distributed from a PC which is included in an information distribution system according to one embodiment of the present invention.

Referring to the flow chart of FIG. 1, the following describes a flow of processes in the PC 2A when the reuse information key is distributed.

First, in S31, the user of the PC 2A gives an instruction for reuse of specific distribution-use music data stored in the PC 2A. The order placing section 36 then requests the distribution server 1 to allow reuse of the specific distribution-use music data (S32). Specifically, the distribution server 1 is requested to distribute a reuse information key which records available copy count information of the data desired by the user. Here, the authentication check section 23 sends out the ID and password of the PC 2A to perform authentication.

In receipt of the request for reuse, the distribution server 1 first charges the PC 2A and then sends the reuse information key which records the available copy count information at the request of the user to the PC 2A. The PC 2A in the reuse setting section 28 processes the reuse information key so received (S33).

Then, the reuse setting section 28 rewrites the available copy count information in the header section of distribution-use music data corresponding to the reuse information key so received (S34). At this time, reproducible environment information in the header section of the distribution-use music data is also rewritten. Note that, the reproducible environment information may be rewritten at the time when the data is first reproduced after the reuse information key is downloaded. Further, the reproducible environment information may be recorded on the side of the distribution server 1 before the reuse information key is downloaded.

Subsequently, in the presence of instructions for copying from the user, the data copying section 26 copies the distribution-use music data to a desired recording medium (S35).

Note that, the amount charged for the distribution of the reuse information key may be less than the amount charged for the distribution of the distribution-use music data itself. This is because users requiring the reuse information key have already paid the fee when the distribution-use music data was previously distributed. As a result, the user can avoid paying the same amount of fee twice for the same data.

Further, as is clear from the comparison of FIG. 5 and FIG. 6, the data volume of the reuse information key much smaller than that of the distribution-use music data is also advantageous for the distributer, because it requires less distribution time for the distributer, i.e., the distribution time dispensed by the distribution server 1. Therefore, it is not difficult to charge less for the distribution of the reuse information key than that for the distribution-use music data itself.

This is a benefit to the user in that it enables the user to reuse the distribution-use music data more freely, and also to the distribution server 1 in that it increases the profit by the increased number of requests for the reuse of distribution-use music data.

Figure 10:
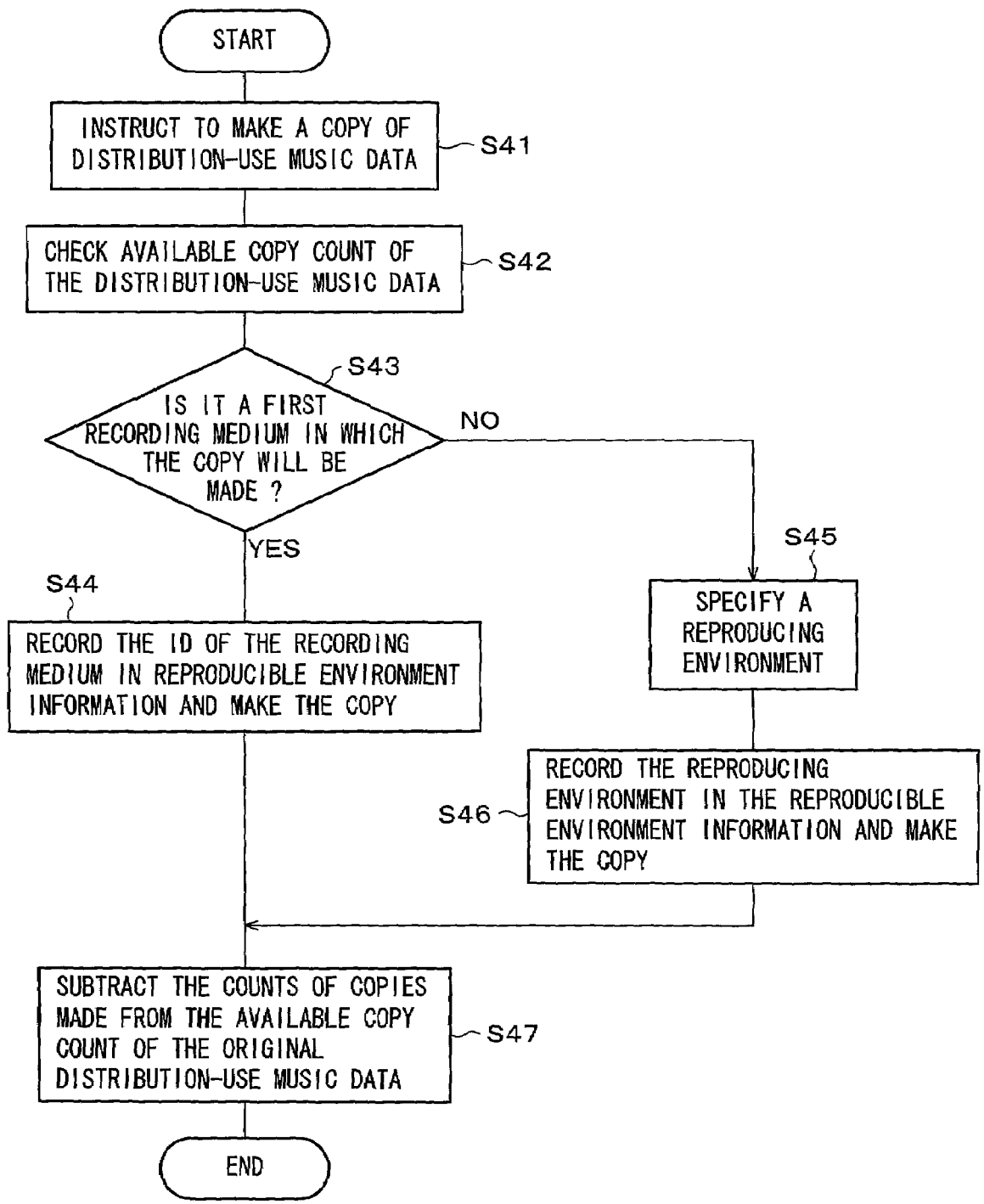
FIG. 10 is a flow chart showing the flow of processes in the case where the PC makes a duplicate of the distribution-use music data.

Referring to the flow chart of FIG. 10, the following describes copying of distribution-use music data in the PC 2A. First, the recording medium to copy the distribution-use music data is classified into two types as follows.

A first recording medium is such that it has an ID authentication function itself, i.e., it corresponds to the foregoing recording medium capable of ID authentication. In the examples shown in FIG. 2, the memory means 4 provided in the portable terminal 3 corresponds to the first recording medium 1.

A second recording medium is such that it does not have an exclusive ID itself, and it does not have a basic standard for protecting copyrights. In the example shown in FIG. 2, the removable media used in the removable media drive 5, the hard disk of the external hard disk drive 6, and the hard disk in the PC 2B correspond to the second recording medium.

In S41 of the flow chart shown in FIG. 10, the user of the PC 2A gives an instruction for copying distribution-use music data stored in the PC 2A. Here, the user can also give an instruction regarding available copy count required for the copied distribution-use music data (simply "copy data" hereinafter).

In S42, the data copying section 26 checks the available copy count information of the distribution-use music data, so as to confirm whether the current available copy count information is at or exceeds the required available copy count. Here, if the current available copy count information is less than the required available copy count, unavailability of copying is informed to the user before the process ends. In this case, if required, the user may make the request for reuse.

Then, in S43, it is judged whether or not the recording medium to copy data as instructed by the user is the first recording medium. When it is judged that the recording medium to copy data is the first recording medium, the sequence goes to S44. On the other hand, when it is judged that the recording medium to copy data is the second recording medium, the sequence goes to S45.

When it is judged in S43 that the recording medium to copy data is the first recording medium, the distribution-use music data stored in the PC 2A is copied to the recording medium, and the ID of the recording medium is recorded on the reproducible environment information in the header section of the copy data (S44) This makes the copy data available only when it is recorded in this recording medium. That is, this copy data cannot be reproduced from another recording medium even when it is copied to this recording medium, because the reproducible environment information contains the ID of the original recording medium.

On the other hand, when it is judged in S43 that the recording medium to copy data is not the first recording medium, the recording medium is regarded as the second recording medium. In S45, the user makes entry to specify the environment where the copy data is to be reproduced. Subsequently, in S46, the distribution-use music data stored in the PC 2A is copied to the recording medium, and the reproducing environment specified by the user is recorded on the reproducible environment information of the copy data. This makes the copy data available for reproduction only in the reproducing environment specified in this manner. That is, because the reproducible environment information is checked when reproducing the copy data, the copy data cannot be reproduced even when an attempt was made to reproduce it in a device of an environment other than the reproducing environment specified by the user.

For example, in the structure shown in FIG. 2, the PC 2A is usually specified as the reproducing environment when the recording medium to copy data is the removable media in the removable media drive 5, or the hard disk in the hard disk drive 6. In this case, the reproducing environment specified by the user is the PC 2A, and, for example, the management number of the OS of the PC 2A is recorded as the reproducible environment data.

Further, when the recording medium to copy data is, for example, the hard disk in the PC 2B, the PC 2B is usually specified as the reproducing environment. In this case, the reproducing environment specified by the user is the PC 2B, and, for example, the management number of the OS of the PC 2B is stored as the reproducible environment data. Here, in the case where the available copy count information of the copy data copied to the PC 2B indicates the count of one or more, further copying of data from the PC 2B to other recording medium is possible.

In this manner, the distribution-use music data can be copied and used in a PC different from the one which has downloaded it, so long as the available copy count is not zero. This eliminates the conventional inconvenience inflicted on the user to download the same data twice and pay the fee each time the data is downloaded.

Note that, when the PC 2B is adapted to connect itself to the Internet, the distribution-use music data may be distributed in the following manner. For example, when the available copy count of the distribution-use music data stored in the PC 2A is zero, the distribution-use music data is directly stored in the PC 2B. At this time, the reproducible environment information of the distribution-use music data stored in the PC 2B is based on the environment information of the PC 2A, and therefore the PC 2B cannot reproduce this data. Thus, access is made to the distribution server 1 via the PC 2B to send a request for distributing the reuse information key. Then, after paying the required fee, the PC 2B receives the reuse information key. The reuse information key is then used to rewrite the header section of the distribution-use music data stored in the PC 2B, making the distribution-use music data available for the PC 2B.

This was attained conventionally by the PC 2B which needed to download the distribution-use music data entirely from the distribution server 1, which required high cost of charge and long download time. On the other hand, the foregoing method is highly convenient for the user because it enables the distribution-use music data to be used in the PC 2B only by downloading the reuse information key which is relatively inexpensive and small in data size.

In S47, the available copy count of the original distribution-use music data stored in the PC 2A is decreased by the number of copies made in S44 or S46, and copying is finished thereafter.

Note that, as the term is used herein, "copying" not only includes making duplicates of contents data contained in the distribution-use music data, but also, for example, duplicates of contents data in a recording medium after converting it to a different data format. Thus, the available copy count information of the distribution-use music data is also updated in copying of data which involves conversion into another data format. Further, in this case, the data format of the conversion may be used to judge whether the data was copied or not. That is, when the data format of the conversion is such that it is detrimental to the quality (sound quality) of the contents data, the process which would result in such poor quality may be regarded as not "copying".

Note that, in addition to the foregoing copying, the system may be adapted so that the data can be transferred back to the PC 2A from the recording medium which has copied the data. That is, when the copy data stored in the recording medium is no longer required, the copy data may be erased from the recording medium and the available copy count information of the distribution-use music data of the PC may be modified to increase the count by the available copy count stored in the copy data.

Note that, a common recording medium used to record music data is the MD (Mini-Disc). To copy music data to MD, the PC 2A records the data in MD by outputting the music signal from a digital output terminal concurrently with or separately from the reproducing operation of the distribution-use music data. In this case, copyrights are protected according to the digital copy management for MD. That is, in the specifications of MD, digital copying of digitally recorded music data from one MD to another is prohibited.

Further, the music data recorded in MD, even when it is produced from digital copying, has a poorer sound quality than that of the original music data, because the data is compressed according to the sound compression technique used in MD. Therefore, strictly speaking, perfect digital copying of data is not possible when using MD.

Second Embodiment

The following will describe another embodiment of the present invention with reference to FIGS. 11 through 14.

Figure 11:
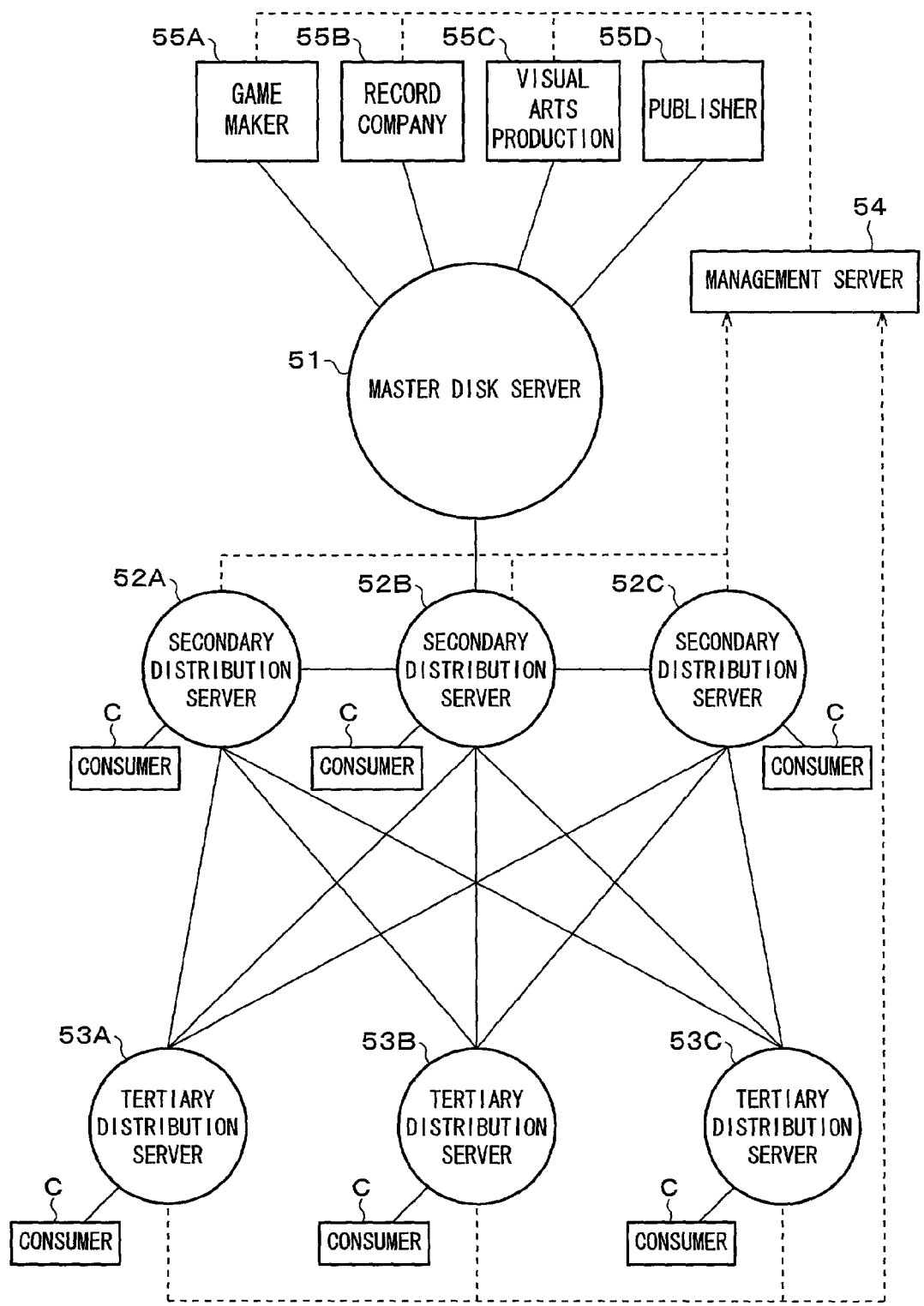
FIG. 11 is an explanatory view schematically showing an arrangement of an information distribution system according to another embodiment of the present invention.

FIG. 11 is an explanatory view showing a schematic structure of an information distribution system according to the present embodiment. As shown in FIG. 11, the information distribution system includes: a master disk server (distribution device, information distribution device) 51 storing various contents data such as game program data, music data, video data, and publishing data; secondary distribution servers (distribution device, information distribution device, receiving device, information receiving device) 52A, 52B, 52C; and tertiary distribution servers (distribution device, information distribution device, receiving device, information distribution device) 53A, 53B, 53C.

Note that, in the actual system, a larger number of secondary distribution servers or tertiary distribution servers may be used. Further, lower distribution servers, such as quaternary or quinary distribution server, may be provided below the tertiary distribution server. Further, the system may include a plurality of maser disk servers.

The master disk server 51 indicates a server computer which stores the foregoing original data, and a master disk server manager which manages the server computer, for example as shown in FIG. 11, based upon a contract with a copyright manager (information source provider) such as a game maker 55A, a record company 55B, a visual arts production 55C, or a publisher 55D. The master disk server 51 stores digital original data, or distribution data which has been converted into a data format suitable for distribution based on the original data.

The secondary distribution servers 52A, 52B, 52C indicate a server computer which is connected to the master disk server 51 via a communication line, and a secondary distributer which manages the server computer. The secondary distribution servers 52A, 52B, 52C can download the original data or distribution data stored in the master disk server 51 via a communication line based upon a contract with the master disk server manager.

The secondary distribution servers 52A, 52B, 52C are also connected to one another via a communication line, enabling data exchange between the servers based upon a contract between them.

Further, the secondary distribution servers 52A, 52B, 52C can sell data to consumer C. The mode of retail is not particularly limited. In an exemplary mode of retail, consumer C may purchase a recording medium by recording the data of his/her want in it from a terminal which is provided in a convenience store or arcade.

The tertiary distribution servers 53A, 53B, 53C indicate a server computer which is connected to the secondary distribution servers 52A, 52B, 52C via a communication line, and a tertiary distribution manager which manages the server computer. The tertiary distribution servers 53A, 53B, 53C can download distribution data stored in the secondary distribution servers 52A, 52B, 52C via a communication line based upon a contract with the secondary distributer.

As shown in FIG. 11, the tertiary distribution servers 53A, 53B, 53C are connected to a plurality of secondary distribution servers. That is, the tertiary distribution servers 53A, 53B, 53C can receive data from any of the secondary distribution servers via their connections.

The tertiary distribution servers 53A, 53B, 53C are adapted to sell data to consumer C. The mode of retail is not particularly limited, and the same mode of retail adopted by the secondary distribution servers 52A, 52B, 52C may be employed. That is, it is possible to employ the mode of retail in which consumer C purchases a recording medium by recording the data of his/her want in it from a terminal which is provided in a convenience store or arcade.

Note that, in the example as shown in FIG. 11, the tertiary distribution servers 53A, 53B, 53C do not have a terminal function of further distributing data. However, for example, the tertiary distribution servers 53A, 53B, 53C may be adapted so that data can be exchanged between the servers based upon a contract between them. Further, there may be provided quaternary distribution server or quinary distribution server which is connected to the upper distribution servers.

Further, as shown in FIG. 11, the information distribution system according to the present embodiment includes a management server 54, separately from the data distribution path made up of the master disk server and n stages of distribution servers. The management server 54 is connected to the secondary distribution servers 52A, 52B, 52C and tertiary distribution servers 53A, 53B, 53C. The management server 54 is adapted to receive from these distribution servers history data (distribution history information), details of which will be described later, which is issued when data are sold. The history data collected in the management server 54 is then sent to the copyright managers, i.e., the game maker 55A, record company 55B, visual arts production 55C, and publisher 55D. This enables the copyright managers to have an idea of proceeds of data managed thereby.

The following describes a system of distribution in the information distribution system of FIG. 11, wherein, for example, the tertiary distribution server receives data from any one of secondary distribution servers, and sells the data to a consumer. Here, the server at the distributing end of data will be called a distribution server, and the server which receives and sells data to a consumer will be called a receiving server. Note that, the foregoing described the case where the secondary distribution server and the tertiary distribution server had the relationship of distribution server and receiving server. However, the relationship between distribution servers in the system is not just limited to this and is such that data are distributed from one distribution server to another.

Figure 12:
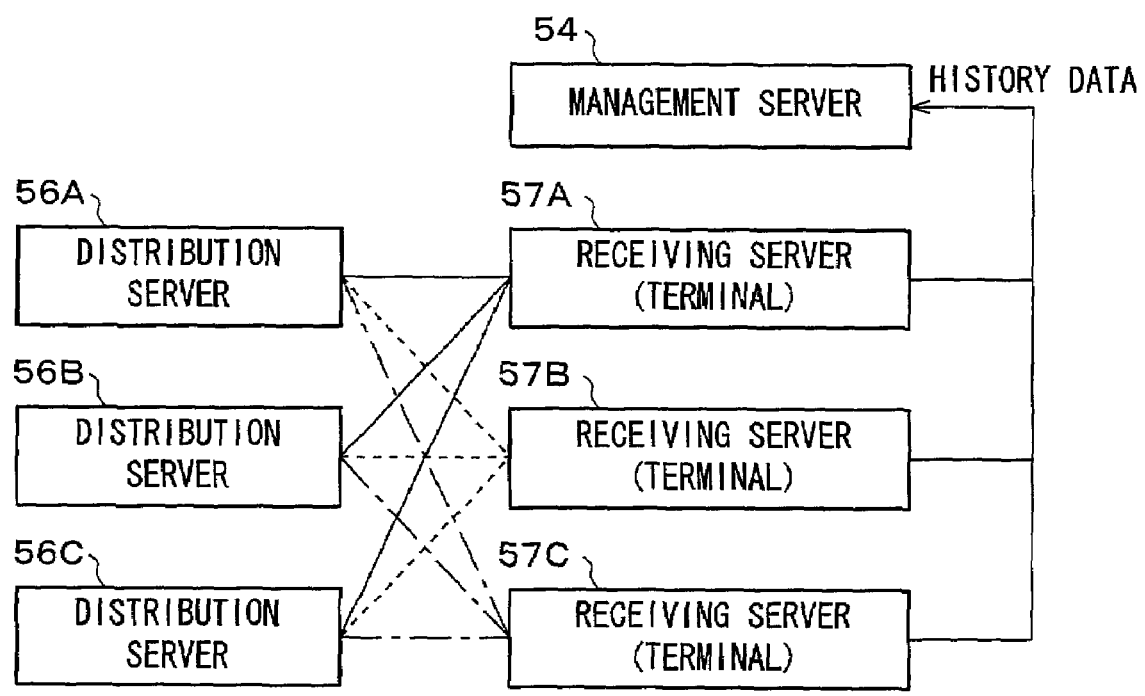
FIG. 12 is a block diagram schematically showing an arrangement of a system made up of a plurality of distribution servers and a plurality of receiving servers.

FIG. 12 is a block diagram showing a schematic structure of a system composed of plural distribution servers and plural receiving servers. FIG. 12 shows three distribution servers 56A, 56B, 56C, and three receiving servers 57A, 57B, 57C, and a management server 54. The receiving servers 57A, 57B, 57C are connected to each of the distribution servers 56A, 56B, 56C. In other words, the receiving servers 57A, 57B, 57C can receive data from any of the distribution servers 56A, 56B, 56C.

The management server 54 is connected to each of the receiving servers 57A, 57B, 57C, and adapted to receive history data which is issued when data are sold. Note that, it is assumed in the system of FIG. 12 that no data are sold by the distribution servers 56A, 56B, 56C. As such, no history data are sent from the distribution servers 56A, 56B, 56C to the management server 54.

Figure 13:
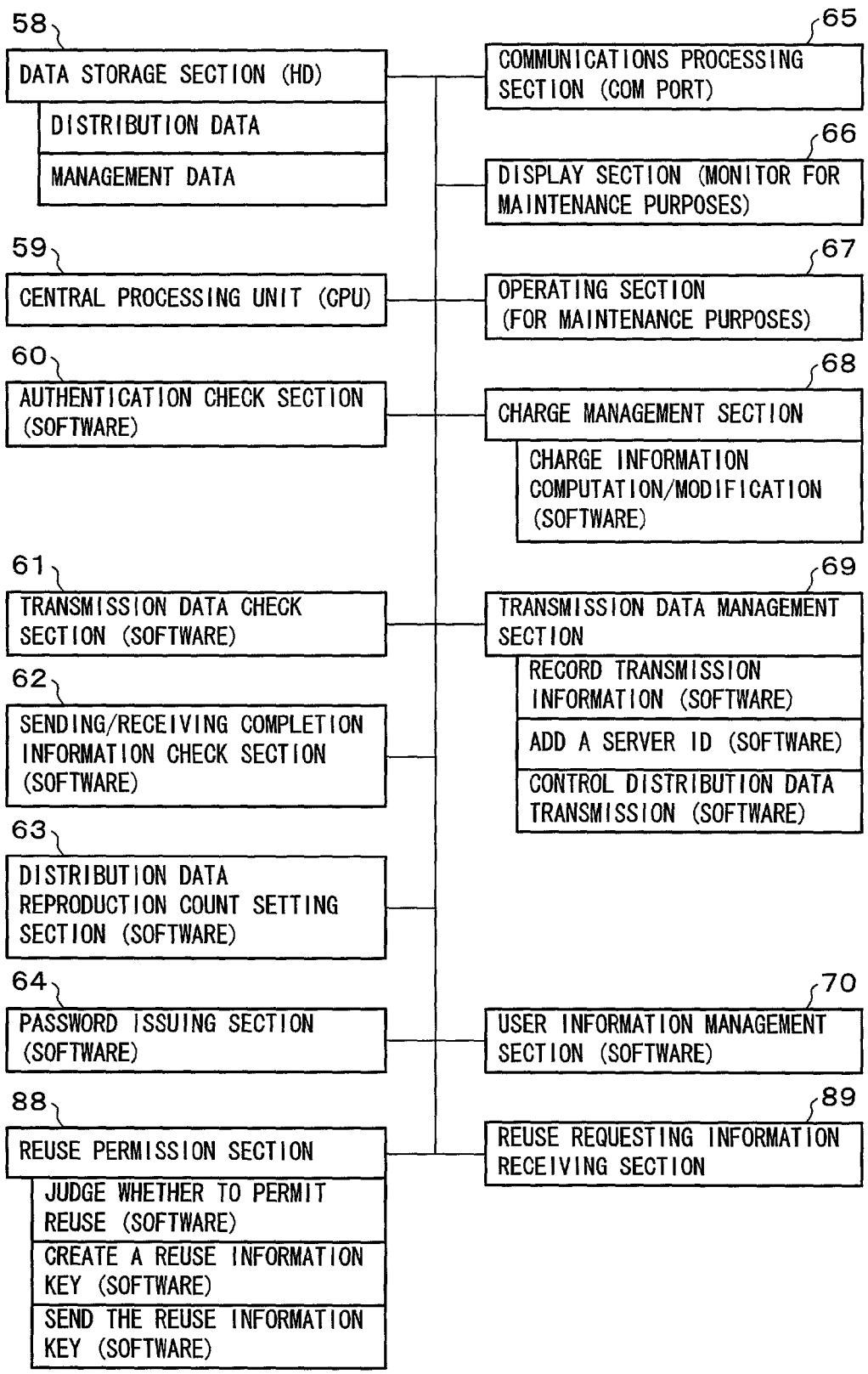
FIG. 13 is a block diagram schematically showing an arrangement of a distribution server.

The following describes a structure of the distribution servers 56A, 56B, 56C. FIG. 13 is a block diagram showing a schematic structure of the distribution servers 56A, 56B, 56C. Note that, shown in FIG. 13 is an exemplary structure in which the principal architecture of the distribution servers 56A, 56B, 56C is based on a PC.

As shown in FIG. 13, the distribution servers 56A, 56B, 56C include a data storage section 58, a central processing section 59, an authentication check section 60, a transmission data check section 61, a sending/receiving completion information check section 62, a distribution data reproduction count setting section 63, a password issuing section 64, a communications processing section 65, a display section 66, an operating section 67, a charge management section 68, a transmission data management section 69, a user information management section 70, a reuse permission section 88, and a reuse requesting information receiving section 89.

Note that, FIG. 13 shows these components as if they are all connected in the same manner. In reality, however, some portions are connected in terms of hardware via various busses, interfaces and the like, and the others are connected in terms of software by association made over control/processing programs.

In the following descriptions of the components of the distribution servers 56A, 56B, 56C, the distribution servers 56A, 56B, 56C will be called simply as a distribution server.

The data storage section 58 is made up of storage means, such as a hard disk device, for example. The data storage section 58 stores distribution data which is a target for distribution and/or various management data related to distribution. Note that, within this hard disk device or a different hard disk device are stored the OS, various programs, data and the like that are necessary for the operation of the distribution server.

The central processing section 59 is made up of a computing device, such as a CPU. The central processing section 59 performs various computations in the distribution server. Note that, though not shown, the central processing section 59 has a RAM (Random Access memory) that is necessary for performing various computations.

The communications processing section 65 is arranged to be a network interface with a computer which is provided outside the distribution server. A specific COM port of the computer making up the distribution server is allotted as the communications processing section 65. Note that, the type and form of the network interface are not particularly limited, and there is adopted, for example, the Ethernet, an FDDI, the ISDN, an ATM or the like.

The display section 66 is made up of any of various display monitors, such as a CRT, an LCD and the like. Further, the operating section 67 is made up of input devices, such as a keyboard and/or a mouse. The display section 66 and the operating section 67 perform maintenance, such as checking the operation state of the distribution server, changing processing operation and the like.

The data storage section 58, the central processing section 59, the communications processing section 65, the display section 66 and the operating section 67 thus explained are blocks indicative of the hardware arrangement of the distribution server. Further, the authentication check section 60, the transmission data check section 61, the sending/receiving completion information check section 62, the distribution data reproduction count setting section 63, the password issuing section 64, the charge management section 68, the transmission data management section 69, the user information management section 70, the reuse permission section 88, and the reuse request information receiving section 89 are blocks indicative of the software arrangement of the distribution server.

The authentication check section 60 is a block to perform authentication check with respect to a receiving server from which a request for distribution of distribution data is transmitted to the distribution server. When the receiving server requests access to the distribution server, the authentication check section checks the ID and password of the receiving server. Only when the receiving server passes the authentication check, the distribution of the distribution data is permitted.

The transmission data check section 61 is a block to check if data information including specific distribution data, distribution of which is requested by the receiving server, reproduction count information (reproducible count information) of the distribution data and the like coincides with data information stored in the distribution server. In other words, the transmission data check section 61 is a block to check whether or not the distribution server can appropriately respond to the request for distribution sent from the receiving server. In the case where the transmission data check section 61 judges that distribution cannot be permitted, the judgment is transmitted to the receiving server.

The sending/receiving completion information check section 62 is a block to check whether or not distribution data was sent to the receiving server without troubles after the distribution server sent the distribution data to the receiving server. More specifically, the sending/receiving completion information check section 62 checks whether or not sending/receiving was done successfully by checking whether or not a signal indicating that the receiving server finished receiving the distribution data has been received. Here, when there is an error in transmission/reception of data, the trouble is assumed to be on the side of the receiving server if no error is found in the distribution server, and, though not shown in FIG. 12, error information is sent to the management server 54. This makes it possible to promptly notify the management server 54 of the trouble of the terminal, for example, when the receiving server 54 is an independent terminal with no operator.

The distribution data reproduction count setting section 63 is a block which sets reproduction count information in data information of the distribution data according to the reproduced number of specific data which is distributed at the request of the receiving server. That is, the receiving server receives data with the reproduction count information which was set by the distribution data reproduction count setting section 63, and the receiving server reproduces the data based on the restriction of this reproduction count information.

Note that, as the term is used herein, "reproduction" refers to selling of data to a consumer. That is, "reproduction" counts once when data is recorded in a recording medium, for example, using a terminal, and when this recording medium is delivered to the consumer.

The password issuing section 64 is a block to issue a password to each receiving server subscribing to distribution data distribution. A system of the password to be adopted here may be a system which allows the password to be changed by request of the receiving server or a system which allows the password to be changed by a decision made by the distribution server.

The user information management section 70 is a block to manage various information on each receiving server subscribing to distribution data distribution. The various information here includes not only the ID and password but also the status and history of data distribution, system environment, and the like regarding each receiving server.

The charge management section 68 is a block to compute charge information of distribution data, or to change the amount charged per reproduction.

The transmission data management section 69 is a block to perform, when transmitting the distribution data to the receiving server, recording of information on the transmission as a log and control of the transmission of the distribution data by adding a distribution server ID to the distribution data.

The reuse request information receiving section 89 is a block to receive from the receiving server a request for distribution of a reuse information key. Further, the reuse permission section 88 is a block to judge whether to permit reuse of the distribution data based on the content of reuse request data received by the reuse request information receiving section 89, create a reuse information key, and send the reuse information key thus created to the receiving server that sent the reuse request data. The process performed in the reuse permission section 88 will be discussed later.

Here, the following describes the distribution data sent from the distribution server to the receiving server, and the reuse information key. The distribution data and the reuse information key are essentially the same as their counterparts as shown in FIG. 5 and FIG. 6 of the First Embodiment, respectively. The differences from the previous embodiment are the reproduction count information (reproducible count information), which was the available copy count information in the First Embodiment, and the contents data stored in the data section of distribution data, which were limited to music data in the First Embodiment but not limited in this embodiment. The other data are as described in the First Embodiment and further explanations thereof are omitted here. Note that, the foregoing First Embodiment described the case where the header information of distribution data was included in the contents data by the electronic watermark technique. The present embodiment can also employ the distribution data having the same data structure, taking into consideration the foregoing differences.

Further, it is also possible to provide a footer section in the distribution data and the reuse information key, and record in this footer section a distribution server ID (identification data) of distribution servers which were visited by these distribution data and reuse information key in order of their visit. In this way, full distribution history is recorded in the footer section, which makes it possible to fully grasp the path of the distribution data and reuse information key distributed to the current server. Note that, the distribution history data, which is recorded in the footer section in the foregoing arrangement, may be recorded without any restriction, for example, in the header section or data section.

Figure 14:
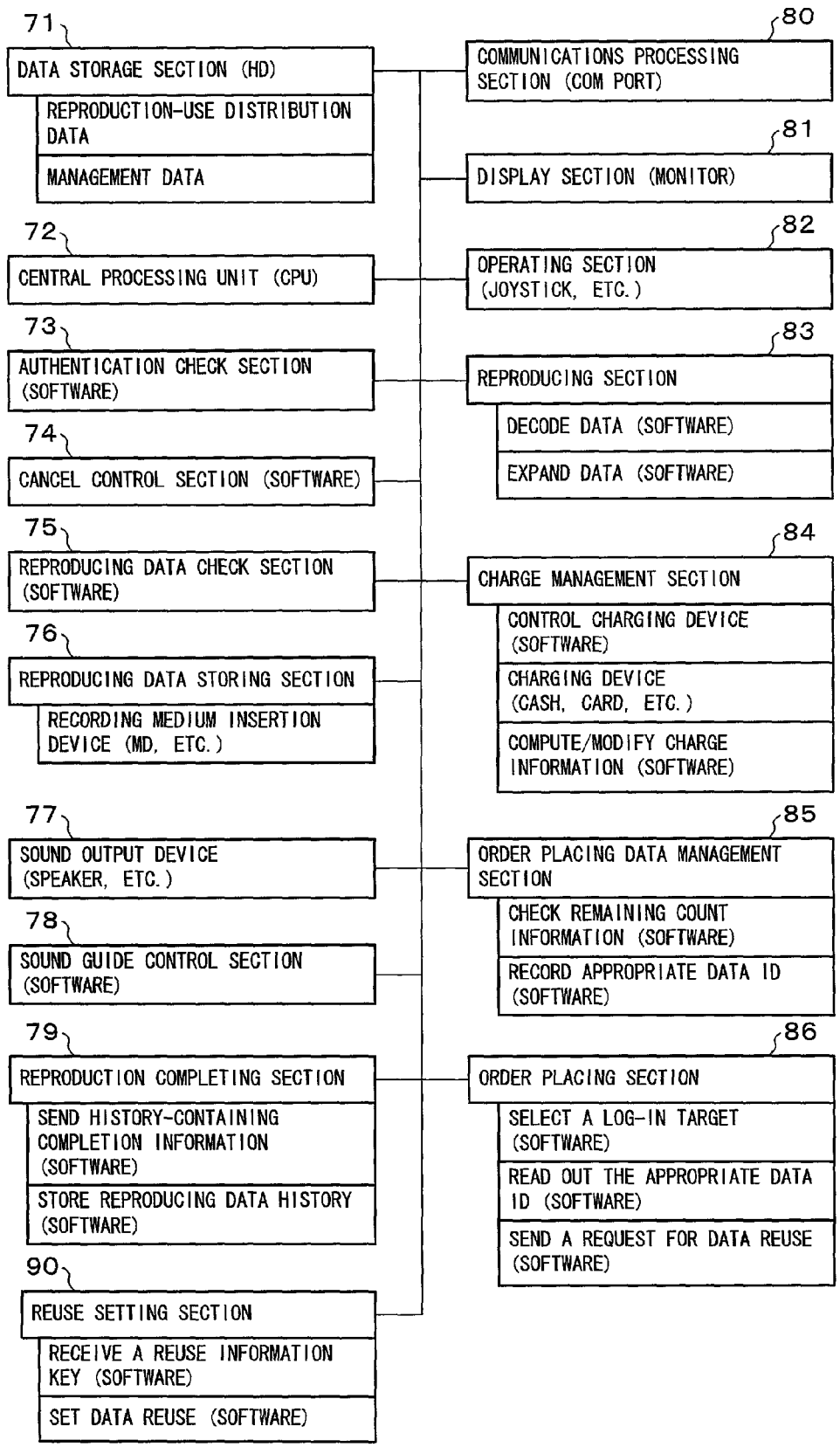
FIG. 14 is a block diagram schematically showing an arrangement of a receiving server.

The following describes a structure of the receiving servers 57A, 57B, 57C. FIG. 14 is a block diagram showing a schematic structure of the receiving servers 57A, 57B, 57C. Note that, shown in FIG. 14 is an exemplary structure in which the principal architecture of the receiving servers 57A, 57B, 57C is based on a PC. As shown in FIG. 14, the receiving servers 57A, 57B, 57C include a data storage section 71, a central processing section 72, an authentication check section 73, a cancel control section 74, a reproducing data check section 75, a reproducing data storing section 76, a sound output device 77, a sound guide control section 78, a reproduction completing section (supply management section) 79, a communications processing section 80, a display section 81, an operating section 82, a reproducing section (supply section) 83, a charge management section 84, an order placing data management section 85, an order placing section 86, and a reuse setting section 90. Note that, FIG. 14 shows these components as if they are all connected in the same manner. In reality, however, some portions are connected in terms of hardware via various busses, interfaces and the like, and the others are connected in terms of software by association made over control/processing programs. In the following descriptions of the components of the receiving servers 57A, 57B, 57C, the receiving servers 57A, 57B, 57C will be called simply as a receiving server.

The data storage section 71 is made up of storage means, such as a hard disk device, for example. The data storage section 71 stores reproducing distribution data from the distribution server, and/or various management data associated with reception and reproduction of the data. Note that, within this hard disk device or a different hard disk device are stored the OS, various programs, data and the like that are necessary for the operation of the receiving server.

The central processing section 72 is made up of a computing device, such as a CPU. The central processing section 72 performs various computations in the receiving server. Note that, though not shown, the central processing section 72 has a RAM (Random Access memory) that is necessary for performing various computations.

The communications processing section 80 is arranged to be a network interface with a computer which is provided outside the receiving server. A specific COM port of the computer making up the distribution server is allotted as the communications processing section 80. Note that, the type and form of the network interface are not particularly limited, and there is adopted, for example, the Ethernet, an FDDI, the ISDN, an ATM or the like.

The display section 81 is made up of any of various display monitors, such as a CRT, an LCD and the like. Further, the operating section 82 is made up of input devices, for example, such as a joy stick or various buttons. The consumer can purchase data of his/her want by the input operation on the operating section 82 through the display of the display section 81.

The reproducing data storing section 76 is a block which records data purchased by the consumer in a recording medium. Examples of recording medium include, without any restriction, for example, MD, CD-R, CD-RW, DVD-R, DVD-RW, DVD-RAM, IC memory, flexible disk, ZIP disk (registered trademark), MO, and small hard disk. These recording media may be carried by the consumer to record data, or may be stored in a terminal so that the consumer can be charged for the data together with the recording medium when the data is purchased.

The sound output device 77 is a block, made up of an amplifier and a speaker, etc., for outputting various sounds. For example, when the consumer purchases music data, the sound output device 77 outputs sample sound of the music, the sound of operation guidance, or BGM (Back Ground Music).

The data storage section 71, the central processing section 72, the communications processing section 80, the display section 81, the operating section 82, the reproducing data storing section 76, and the sound output section 77 thus explained are blocks indicative of the hardware arrangement of the receiving server. Further, the authentication check section 73, the cancel control section 74, the reproducing data check section 75, the sound guide control section 78, the reproduction completing section 79, the reproducing section 83, the charge management section 84, the order placing data management section 85, the order placing section 86, and the reuse setting section 90 are blocks indicative of the software arrangement of the receiving server.

The authentication check section 73 is a block to perform authentication of data distribution by sending a request for distribution of specific data to the distribution server. When requesting distribution of data, the authentication check section 73 sends out the ID and password of the receiving server, and the distribution server performs authentication of these ID and password. The distribution server distributes the requested data to the receiving server when the authentication is successful.

The cancel control section 74 is a block to stop reproduction of data and cancel charging for the data when a request for reproducing data is cancelled by the consumer.

The reproduction data check section 75 is a block to check reproducible count information of specific data which was requested by the consumer to be reproduced, when it is stored in the receiving server, so as to judge whether or not the data can be reproduced.

The sound guide control section 78 is a block to control various sound guide directed to the consumer, concerning reproduction of data.

The reproducing section 83 is a block to decode encrypted data and to decompress (decode) the data when it is compressed. This converts the requested reproducing data into a reproducible data format.

The charge management section 84 is a block to manage charging of data when a request for reproduction of data, i.e., a request for purchase of data is made by the consumer. The mode of charging includes payment by cash, credit card, debit card, and prepaid card. Thus, the charge management section 84 is provided with a device which becomes an inlet/outlet of cash, or a device which enables settlement using a credit card, together with a system for controlling these devices. Further, the charge management section 84 also has a function of computing charge information of distribution data, or changing the amount charged per reproduction.

The order placing data management section 85 is a block to check the reproduction count information of data stored in the receiving server, so as to record and manage the reproduction count information with the ID of each data. The order placing data management section 85 makes it possible to grasp the reproducible count of each data stored in the receiving server.

The order placing section 86 is a block to send a request to the distribution server for reuse of data, with respect to those data with the reproducible data count of zero, or at or below a predetermined value, as checked by the order placing data management section 85. Here, a distribution server is suitably selected according to the data to be distributed upon request. Further, the order placing section 86 sends a request to the distribution server for the distribution of distribution data, corresponding to the data requested by the consumer to be reproduced, when this distribution data is not stored in the receiving server.

The reproduction completing section 79 is a block which become operable when reproduction of data is completed as requested by the consumer, to send history data to the management server 54 and store the history data, when the footer section of the distribution data has history information.

By this operation of the reproduction completing section 79, the management server 54 receives history data including the foregoing data every time data is reproduced. This makes it possible to grasp the distribution route of the original data, which is distribution data, to the consumer with respect to all data. As a result, by the information extracted from the management server 54, the copyright managers, such as the game maker 5A, the record company 5B, the visual arts production 5C, and the publisher 5D can have an idea of the distribution path of their data, whose copyright is managed thereby, and when and in what quantity these data were purchased by the consumer. This enables the copyright managers to accurately charge the consumer for copyright fees. That is, the copyright managers can have more confidence in a data distribution system, such as the information distribution system of the present embodiment, in which the distribution route is used by a plurality of distributors, instead of being centrally managed by a single distributer, to distribute data relatively freely.

The reuse setting section 90 is a block to receive the reuse information key with respect to the distribution data stored in the receiving server from the distribution server and rewrite data within the distribution data based on the reuse information key thus received.

The following describes how the receiving server places re-order to the distribution server so that the distribution data which was distributed previously can be preserved.

As described, the receiving server stores distribution data composed of a header section and a data section. The data section is used repeatedly by being distributed or recorded in a recording medium as duplicates until the reproduction count information contained in the header section indicates zero. That is, the data section is reused and is not erased even when it is distributed or copied. Therefore, the data section itself remains in the receiving server even after the reproduction count information indicates zero, though distribution or copying of the data section is not possible in this case.

Thus, in the information distribution system according to the present invention, when distribution or copying of distribution data is desired in the receiving server after the reproduction count information indicates zero, the receiving server sends a request to another distribution server for the update of the reproduction count information, i.e., distribution of reuse information key. In response to this request, the distribution server supplies new reproduction count information, i.e., distributes the reuse information key, to the receiving server, so that the right to distribute or copy the distribution data for the required number of times of reproduction is given to the receiving server within the bounds of contract. As a result, the data section remaining in the distribution server can be utilized.

This enables the data section to be reused only by updating the information of the header section without sending or receiving the data section which occupies most of the data size in the data structure of the distribution data. The effects of this include shorter communication time and improved efficiency of using memories in the receiving server, in addition to the cheaper fee inflicted on reuse of data than that for distributing the original data.

The following describes a flow of processes in the distribution server of FIG. 13. Firstly, a flow of processes of the distribution server when distributing distribution data is essentially the same as that described with reference to FIG. 7 in the First Embodiment. Some of the differences are the type of data, which is the distribution data in the present embodiment, and the distribution-use music data in the First Embodiment, and the party which requests distribution of data, which is the receiving server in the present embodiment, and the PC in the First Embodiment. Further, when distribution history information is to be added to the distribution data, an extra step is incorporated. The other process is the same as that described in the First Embodiment and explanations thereof are omitted here.

Further, a flow of processes of the distribution server when distributing reuse information key is essentially the same as that described with reference to FIG. 8 in the First Embodiment. Some of the differences are the type of data, which is the distribution data in the present embodiment, and the distribution-use music data in the First Embodiment, and the party which requests distribution of data, which is the receiving server in the present embodiment, and the PC in the First Embodiment. Further, when distribution history information is to be added to the reuse information key, an extra step is incorporated. The other process is the same as that described in the First Embodiment and explanations thereof are omitted here. Note that, the process of deciding whether or not to permit reuse in S13 of FIG. 8 remains essentially the same with the foregoing differences.

The following describes a flow of processes in the receiving server of FIG. 14. Firstly, a flow of processes in the receiving server when receiving distribution data will be explained. A request for distribution of distribution data is made to the distribution server when the distribution data, corresponding to the data which was requested by the consumer to be reproduced, is not stored in the receiving server.

Figure 9:
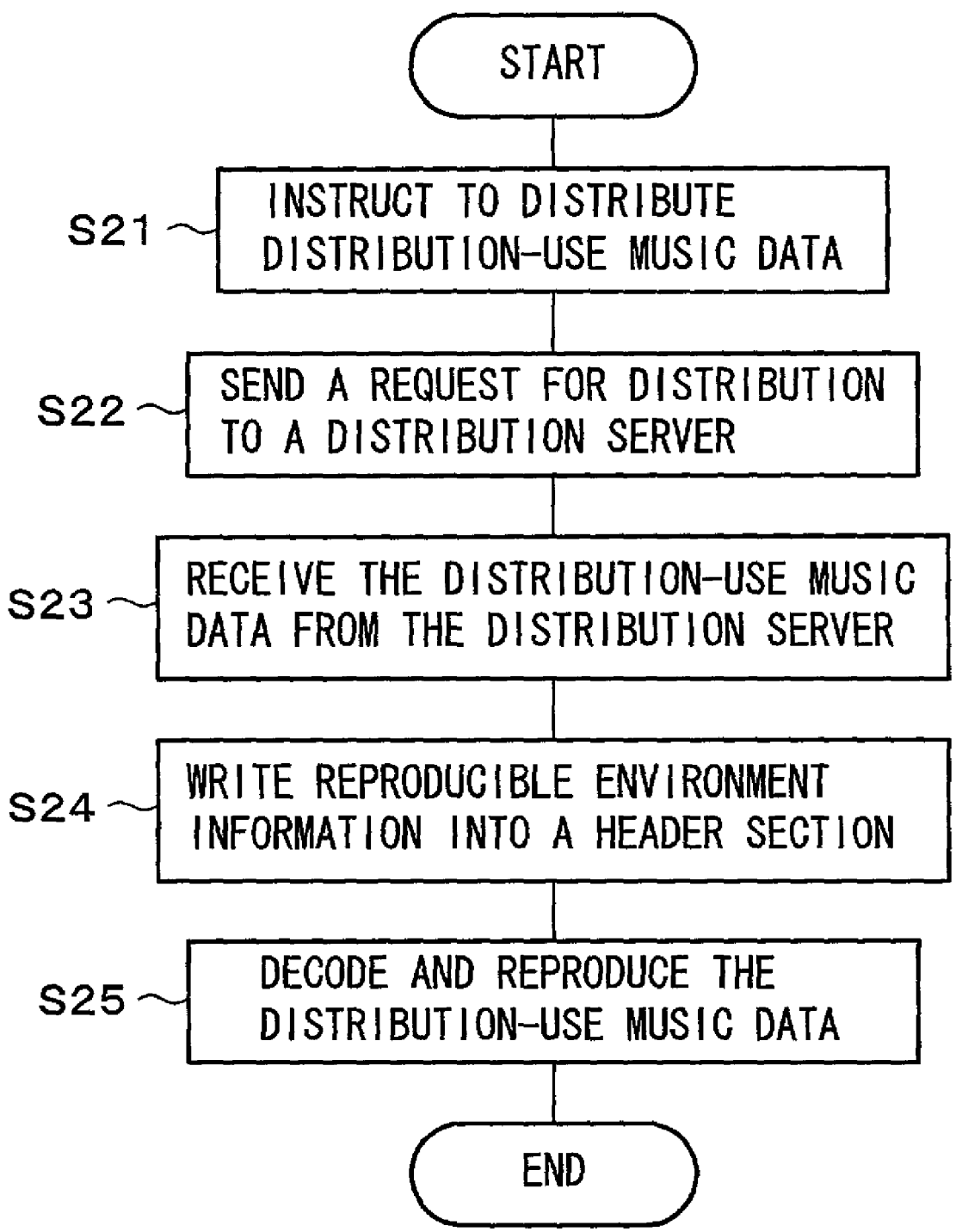
FIG. 9 is a flow chart showing the flow of processes in the case where the PC receives the distribution-use music data.

The flow of processes of the receiving server when receiving distribution data is essentially the same as that described with reference to FIG. 9 in the First Embodiment. Some of the differences are the type of data, which is the distribution data in the present embodiment, and the distribution-use music data in the First Embodiment. Further, when distribution history information is to be added to the distribution data, an extra step of transmitting the history data to the management server 54 is incorporated. The other process is the same as that described in the First Embodiment and explanations thereof are omitted here.

Next, a flow of processes in the receiving server when receiving reuse information key will be explained. A request for reuse of data, i.e., a request for distribution of reuse information key is made when the order placing data management section 85 finds data which indicates the reproducible count of zero, or at or below a predetermined value.

The flow of processes of the receiving server when receiving reuse information key is essentially the same as that described with reference to FIG. 1 in the First Embodiment. Some of the differences are the type of data, which is the distribution data in the present embodiment, and the distribution-use music data in the First Embodiment, and the type of information rewritten, which is the reproduction count information of distribution data in the present embodiment, and the available copy count information of distribution-use music data in the First Embodiment. The other process is the same as that described in the First Embodiment and explanations thereof are omitted here.

Note that, the foregoing described the structures of distribution server and receiving server separately with reference to FIG. 13 and FIG. 14, respectively. However, these structures coexist in a server, for example, such as the secondary distribution servers 52A, 52B, 52C as shown in FIG. 11, which serve to distribute data to other servers, and to sell (reproduce) data to consumer C. Thus, in a server like this, the process of the distribution server and the process of the receiving server are both performed.

Note that, the foregoing description of the information distribution system of FIG. 11 assumed the closed network system in which the servers are connected to one another via designated lines. However, not limited to this, essentially the same structure can be realized when the network as shown in FIG. 11 is implemented on the Internet. In such a system structure on the Internet, the terminal used to reproduce data may be a PC which can be connected to the Internet. In this case, "reproduction" of data is defined to indicate a state in which the contents of the distribution data become available for the PC. Further, in this case, payment is made by settlement using a credit card, or by various types of electronic settlement systems recently proposed.

As described, an information distribution system according to the present embodiment is capable of sufficiently securing security even in an open computer network system such as the Internet. This enables a copyright manager who provides contents to diversify marketing routes for contents in such a state that royalties can accurately be collected. Furthermore, from the consumer's point of view, increase in a selection of purchase routes for contents improves purchase convenience.

Here, the following will explain the process of test listening in the case where the foregoing secondary distribution servers 52A, 52B, 52C and the tertiary distribution servers 53A, 53B, 53C function as terminals provided in a convenience store, arcade or the like, as described above. In this system, consumer C purchases data by recording the data of his/her want in a certain recording medium, from one of these terminals. The terminal is provided with a system which allows consumer C to do test listening before purchasing music data.

Here, it is possible that the header section of distribution data is set to include the data of pre-check allowing information. More specifically, when consumer C requests the terminal to allow him/her to do test listening of specific music data, first, pre-check allowing information in the header section of distribution data corresponding to the music data is referred to. Then, only when the data is given the pre-check allowing information in a state that permits test listening, the test listening of the data can be performed. By providing this pre-check allowing information in the header section of distribution data, an extra step of, for example, preparing test listening-use data other than distribution data can be omitted. Note that, in the present example, an explanation of test listening of music data has been made. However, this system is applicable to distribution of distribution data containing any type of contents data, other than music data, insofar as it makes sense to perform pre-check with respect to that data.

As discussed, an information distribution system according to the present invention has an arrangement in which the receiving device receives a reuse information key indicative of details of changes made in the use limitation information from the distribution device and rewrites use limitation information of distribution data stored in the receiving device based on the received reuse information key.

With this arrangement, the reuse information key indicative of the details of changes made in the reuse limitation information is provided from the distribution device to the receiving device, and the use limitation information of the distribution data is modified based on the reuse information key. Consequently, the use limitation information of the distribution data can be modified in a state that the details of changes made in the use limitation information approved by the distribution device are properly reflected by the receiving device, thereby allowing the distribution device to securely receive a request for modifying use limitation information.

Further, the reuse information key that is provided from the distribution device to the receiving device merely indicates details of changes made in use limitation information. Therefore, in comparison with distribution data containing contents data, the data size of the reuse information key is very small. This greatly cuts the time required to distribute the reuse information key, thereby reducing distribution loads to be carried by both the receiving device and the distribution device.

As discussed, an information distribution system according to the present invention has an arrangement in which the use limitation information is the reproducible count information of appropriate distribution data.

With this arrangement, the distribution data contains the reproducible count information of the distribution data as the use limitation information. Here, it is assumed that "reproducible counts" include the counts of available copying and available data conversion to the data of substantially an equivalent data format, the count of availability of contents data, and the like. Accordingly, in the case where, for example, reproducible count information is set to show the counts of available copying and available data conversion to the data of substantially the equivalent data format, and once the distribution device provides the receiving device with distribution data, defective copy-making such that copies of the distribution data are unlimitedly made from the original distribution data in the receiving device can be prevented. This makes it possible to properly protect copyright even in the case where, for example, contents data contained in the distribution data is copyright.

Further, in the case where, for example, reproducible count information is set to show the count of availability of contents data, and when distribution data is provided from the distribution device to the receiving device, the counts of use of the contents data can be limited, thereby enabling control, for example, of setting the count of use according to a charge.

As discussed, an information distribution system according to the present invention has an arrangement in which the use limitation information is usable environment information of appropriate distribution data.

With this arrangement, the distribution data contains the usable environment information of the distribution data as use limitation information. Accordingly, even when the distribution data provided from the distribution device to the receiving device is copied, the copied distribution data can be used only in an environment in compliance with usable environment information recorded in the distribution data. Consequently, it is possible to properly protect copyright even in the case where, for example, the contents data contained in the distribution data is copyright.

As discussed, an information distribution system according to the present invention has an arrangement in which the receiving device is a PC connected to the Internet.

With this arrangement, since distribution data is received by the PC connected to the Internet, even a general home PC, for example, can receive the contents data as described, thus enabling the general home PC to receive a variety of contents data via the Internet.

As discussed, an information distribution system according to the present invention has an arrangement in which, when the distribution device receives from the receiving device a request for rewriting use limitation information of distribution data, the distribution device judges whether or not it is the distribution device authorized to give permission to rewrite the use limitation information of the distribution data.

With this arrangement, when receiving from the receiving device a request for rewriting use limitation information of distribution data, the distribution device judges whether or not it is the distribution device authorized to give permission to rewrite the use limitation information of the distribution data. Therefore, in the case where, for example, the information distribution system is provided with a plurality of distribution devices, a manager of the information distribution system, for example, can give limitations to the respective distribution devices in terms of their giving permission to rewrite use limitation information.

As discussed, an information distribution system according to the present invention has an arrangement in which, when the distribution device receives from the receiving device a request for rewriting use limitation information of distribution data, the distribution device judges whether or not the receiving device can receive permission to rewrite the use limitation information of the distribution data.

With this arrangement, when the distribution device receives from the receiving device a request for rewriting the use limitation information of the distribution data, the distribution device judges whether or not the receiving device has right to receive permission to rewrite the use limitation information of the distribution data. Accordingly, in the case where, for example, the receiving device has some problems regarding payment of charges, it is possible to take measures, for example, to refuse to give permission to rewrite use limitation information.

As discussed, an information distribution system according to the present invention has an arrangement in which the use limitation information of the distribution data is contained in the distribution data by electronic watermarking.

With this arrangement, the use limitation information is thus contained in the distribution data by the electronic watermarking, thereby making it extremely difficult for a third party to check the use limitation information of the distribution data. This prevents unauthorized rewriting of use limitation information.

As discussed, an information distribution device according to the present invention, which is connected to a communications network and distributes distribution data containing contents data which is provided by an information source provider to receiving devices, has an arrangement in which the distribution data further contains use limitation information thereof, and the information distribution device is provided with a reuse request information receiving section for receiving from the receiving device a request for rewriting the use limitation information of distribution data which is stored in the receiving device, and a reuse permission section for giving permission to rewrite the use limitation information of the distribution data stored in the receiving device.

With this arrangement, the distribution data containing the contents data provided by the information source provider further contains the use limitation information of the distribution data, the reuse request information receiving section receives a request for rewriting the use limitation information of the distribution data stored in the receiving section, and the reuse permission section gives permission to rewrite the use limitation information of the distribution data.

In order to modify use limitation information of distribution data stored in a receiving device, it was conventionally required to receive the same distribution data having different use limitation information from a distribution device. In contrast, in the foregoing arrangement, in order to modify the use limitation information of the distribution data stored in the receiving device, it is required to simply obtain permission to do so from the distribution device, thereby making it possible to modify the use limitation information. This enables modification of the use limitation information of the distribution data stored in the receiving device without receiving, again, the distribution data containing contents data which has a relatively large data size, thereby greatly shortening time for distribution and saving data storage capacitance in the receiving device.

As discussed, an information distribution device according to the present invention has an arrangement in which the reuse permission section sends a reuse information key indicative of details of changes made in the use limitation information with respect to the receiving device, and the receiving device rewrites the use limitation information of distribution data which is stored in the receiving device based on the reuse information key.

With this arrangement, the reuse information key indicative of the details of changes made in the use limitation information is sent from the reuse permission section to the receiving device, and the use limitation information of the distribution data is modified based on the reuse information key. Accordingly, the use limitation information of the distribution data can be modified in a state that the details of changes made in the use limitation information approved by the distribution device are properly reflected by the receiving device, thereby allowing the distribution device to securely receive a request for modifying use limitation information.

Further, the reuse information key that is provided from the distribution device to the receiving device merely indicates details of changes made in use limitation information. Therefore, in comparison with distribution data containing contents data, the data size of the reuse information key is very small. This greatly cuts the time required to distribute the reuse information key, thereby reducing distribution loads to be carried by both the receiving device and the distribution device.

As discussed, an information distribution device according to the present invention has an arrangement in which the use limitation information is the reproducible count information of appropriate distribution data.

With this arrangement, the distribution data contains the reproducible count information of the distribution data as the use limitation information. Accordingly, in the case where, for example, the reproducible count is set to show the counts of available copying and available data conversion to the data of substantially the equivalent data format, and once the distribution device provides the receiving device with distribution data, defective copy-making such that copies of the distribution data are unlimitedly made from the original distribution data in the receiving device can be prevented. This makes it possible to properly protect copyright even in the case where, for example, contents data contained in the distribution data is copyright.

Further, in the case where, for example, the reproducible count is set to show the count of availability of contents data, and when distribution data is provided from the distribution device to the receiving device, the counts of use of the contents data can be limited, thereby enabling control, for example, of setting the count of use according to a charge.

As discussed, an information distribution device according to the present invention has an arrangement in which the use limitation information is usable environment information of appropriate distribution data.

With this arrangement, the distribution data contains the usable environment information of the distribution data as use limitation information. Accordingly, even when the distribution data provided from the distribution device to the receiving device is copied, the copied distribution data can be used only in an environment in compliance with usable environment information recorded in the distribution data. Consequently, it is possible to properly protect copyright even in the case where, for example, the contents data contained in the distribution data is copyright.

As discussed, an information distribution device according to the present invention further includes a reuse permission section which, when the reuse request information receiving section receives from the receiving device a request for rewriting use limitation information of distribution data, judges whether or not the distribution device is authorized to give permission to rewrite the use limitation information of the distribution data.

With this arrangement, when the reuse request information receiving section receives from the receiving device a request for rewriting use limitation information of distribution data, the reuse permission section judges whether or not the distribution device is authorized to give permission to rewrite the use limitation information of the distribution data. Therefore, in the case where, for example, the information distribution system is provided with a plurality of distribution devices, a manager of the information distribution system, for example, can give limitations to the respective distribution devices in terms of their giving permission to rewrite use limitation information.

As discussed, an information distribution device according to the present invention has an arrangement in which, when rewriting of the use limitation information of the distribution data cannot be permitted as a result of judgment by the distribution device, the distribution device sends information indicative of refusal to the receiving device.

This enables a user of the receiving device to promptly learn that the request for rewriting the use limitation information was refused.

Further, as discussed, an information distribution device according to the present invention has an arrangement in which, in the case where rewriting of use limitation information of distribution data cannot be permitted as a result of judgment by the distribution device, the distribution device transfers the request for rewriting the use limitation information of the distribution data to a different distribution device.

Accordingly, even when a user sends the request for rewriting the use limitation information to an inappropriate distribution device, a response to the request for rewriting the use limitation information is automatically made by the different distribution device.

As discussed, an information distribution device according to the present invention has an arrangement in which, when the reuse request information receiving section receives from the receiving device a request for rewriting use limitation information of distribution data, the reuse permission section judges whether or not the receiving device can receive permission to rewrite the use limitation information of the distribution data.

With this arrangement, when the reuse request information receiving section receives from the receiving device a request for rewriting the use limitation information of the distribution data, the reuse permission section judges whether or not the receiving device has right to receive permission to rewrite the use limitation information of the distribution data. Accordingly, in the case where, for example, the receiving device has some problems regarding payment of charges, it is possible to take measures, for example, to refuse to give permission to rewrite use limitation information.

As discussed, an information distribution device according to the present invention has an arrangement in which the use limitation information of the distribution data is contained in the distribution data by electronic watermarking.

With this arrangement, the use limitation information is thus contained in the distribution data by the electronic watermarking, thereby making it extremely difficult for a third party to check the use limitation information of the distribution data. This prevents unauthorized rewriting of use limitation information.

An information receiving device according to the present invention, which is connected to a communications network and receives distribution data containing contents data which is provided by an information source provider from a distribution device, has an arrangement in which the distribution data further contains use limitation information thereof, and the information receiving device is provided with an order placing section which sends a request for rewriting use limitation information of distribution data which is stored in the information receiving device, and a reuse setting section which, when obtaining permission to rewrite the use limitation information of the stored distribution data from the distribution device, rewrites the use limitation information of the distribution data.

With this arrangement, the distribution data containing the contents data provided by the information source provider further contains the use limitation information of the distribution data, the order placing section sends a request for rewriting the use limitation information of the distribution data stored in the receiving device with respect to the distribution device, and the reuse setting section rewrites the use limitation information of the distribution data when receiving permission to do so from the distribution device.

In order to modify use limitation information of distribution data stored in a receiving device, it was conventionally required to receive the same distribution data having different use limitation information from a distribution device. In contrast, in the foregoing arrangement, in order to modify the use limitation information of the distribution data stored in the receiving device, it is required to simply obtain permission to do so from the distribution device, thereby making it possible to modify the use limitation information. This enables modification of the use limitation information of the distribution data stored in the receiving device without receiving, again, the distribution data containing contents data which has a relatively large data size, thereby greatly shortening time for distribution and saving data storage capacitance in the receiving device.

As discussed, an information receiving device according to the present invention has an arrangement in which the reuse setting section receives a reuse information key indicative of details of changes made in the use limitation information from the distribution device, and rewrites the use limitation information of distribution data based on the reuse information key.

With this arrangement, the reuse information key indicative of the details of changes made in the use limitation information is sent from the distribution device to the receiving device, and the use limitation information of the distribution data is modified based on the reuse information key. Accordingly, the use limitation information of the distribution data can be modified in a state that the details of changes made in the use limitation information approved by the distribution device are properly reflected by the receiving device, thereby allowing the distribution device to securely receive a request for modifying use limitation information.

Further, the reuse information key that is provided from the distribution device to the receiving device merely indicates details of changes made in use limitation information. Therefore, in comparison with distribution data containing contents data, the data size of the reuse information key is very small. This greatly cuts the time required to distribute the reuse information key, thereby reducing distribution loads to be carried by both the receiving device and the distribution device.

As discussed, an information receiving device according to the present invention has an arrangement in which the use limitation information is the reproducible count information of appropriate distribution data.

With this arrangement, the distribution data contains the reproducible count information of the distribution data as the use limitation information. Accordingly, in the case where, for example, the reproducible count is set to show the counts of available copying and available data conversion to the data of substantially the equivalent data format, and once the distribution device provides the receiving device with distribution data, illegal duplication such that duplicates of the distribution data are unlimitedly made from the original distribution data in the receiving device can be prevented. This makes it possible to properly protect copyright even in the case where, for example, contents data contained in the distribution data is copyright.

Further, in the case where, for example, the reproducible count is set to show the count of availability of contents data, and when distribution data is provided from the distribution device to the receiving device, the counts of use of the contents data can be limited, thereby enabling control, for example, of setting the count of use according to a charge.

As discussed, an information receiving device according to the present invention has an arrangement in which the use limitation information is usable environment information of appropriate distribution data.

With this arrangement, the distribution data contains the usable environment information of the distribution data as use limitation information. Accordingly, even when the distribution data provided from the distribution device to the receiving device is copied, the copied distribution data can be used only in an environment in compliance with usable environment information recorded in the distribution data. Consequently, it is possible to properly protect copyright even in the case where, for example, the contents data contained in the distribution data is copyright.

As discussed, an information receiving device according to the present invention has an arrangement in which the information receiving device is a PC connected to the Internet.

With this arrangement, since distribution data is received by the PC connected to the Internet, even a general home PC, for example, can receive the contents data as described, thus enabling the general home PC to receive a variety of contents data via the Internet.

As discussed, an information receiving device according to the present invention has an arrangement in which the use limitation information of the distribution data is contained in the distribution data by electronic watermarking.

With this arrangement, the use limitation information is thus contained in the distribution data by the electronic watermarking, thereby making it extremely difficult for a third party to check the use limitation information of the distribution data. This prevents unauthorized rewriting of use limitation information.

As discussed, an information distribution method according to the present invention is connected to a communications network and distributes distribution data containing contents data, which is provided by an information source provider, from a distribution device to receiving devices, the method has an arrangement in which the distribution data further contains use limitation information thereof, and the method including the steps of: receiving from the receiving device a request for rewriting the use limitation information of distribution data which is stored in the receiving device, and giving permission to rewrite the use limitation information of the distribution data stored in the receiving device.

With this method, the distribution data containing the contents data provided by the information source provider further contains the use limitation information of the distribution data, a request for rewriting the use limitation information of the distribution data stored in the receiving section is received, and permission is given to rewrite the use limitation information of the distribution data.

In order to modify use limitation information of distribution data stored in a receiving device, it was conventionally required to receive the same distribution data having different use limitation information from a distribution device. In contrast, in the foregoing method, in order to modify the use limitation information of the distribution data stored in the receiving device, it is required to simply obtain permission to do so from the distribution device, thereby making it possible to modify the use limitation information. This enables modification of the use limitation information of the distribution data stored in the receiving device without receiving, again, the distribution data containing contents data which has a relatively large data size, thereby greatly shortening time for distribution and saving data storage capacitance in the receiving device.

As discussed, an information distribution program and a recording medium having the information distribution program recorded therein according to the present invention which are connected to a communications network, the information distribution program distributing distribution data containing contents data, which is provided by an information source provider, from a distribution device to receiving devices, and the information distribution program and the recording medium have an arrangement in which the distribution data further contains use limitation information thereof, and a computer is used to execute the processes of receiving from the receiving device a request for rewriting the use limitation information of distribution data which is stored in the receiving device, and giving permission to rewrite the use limitation information of the distribution data stored in the receiving device.

With this information distribution program, the distribution data containing the contents data provided by the information source provider further contains the use limitation information of the distribution data, a request for rewriting the use limitation information of the distribution data stored in the receiving section is received, and permission is given to rewrite the use limitation information of the distribution data.

In order to modify use limitation information of distribution data stored in a receiving device, it was conventionally required to receive the same distribution data having different use limitation information from a distribution device. In contrast, in the foregoing arrangement, in order to modify the use limitation information of the distribution data stored in the receiving device, it is required to simply obtain permission to do so from the distribution device, thereby making it possible to modify the use limitation information. This enables modification of the use limitation information of the distribution data stored in the receiving device without receiving, again, the distribution data containing contents data which has a relatively large data size, thereby greatly shortening time for distribution and saving data storage capacitance in the receiving device.

As discussed, an information receiving method according to the present invention is connected to a communications network and receives distribution data containing contents data, which is provided by an information source provider, from a distribution device, the method has an arrangement in which the distribution data further contains use limitation information thereof, and the method including the steps of: sending a request for rewriting use limitation information of distribution data which is stored in the information receiving device with respect to the distribution device, and rewriting the use limitation information of the stored distribution data when obtaining permission to do so from the distribution device.

With this method, the distribution data containing the contents data provided by the information source provider further contains the use limitation information of the distribution data, a request for rewriting the use limitation information of the distribution data stored in the receiving device is sent to the distribution device, and the use limitation information of the distribution data is rewritten when permission to do so is received from the distribution device.

In order to modify use limitation information of distribution data stored in a receiving device, it was conventionally required to receive the same distribution data having different use limitation information from a distribution device. In contrast, in the foregoing method, in order to modify the use limitation information of the distribution data stored in the receiving device, it is required to simply obtain permission to do so from the distribution device, thereby making it possible to modify the use limitation information. This enables modification of the use limitation information of the distribution data stored in the receiving device without receiving, again, the distribution data containing contents data which has a relatively large data size, thereby greatly shortening time for distribution and saving data storage capacitance in the receiving device.

An information receiving program and a recording medium having the information receiving program recorded therein according to the present invention which are connected to a communications network, the information receiving program receiving from a distribution device distribution data containing contents data which is provided by an information source provider, and the information recording program and the recording medium have an arrangement in which the distribution data further contains use limitation information thereof, and a computer is used to execute the processes of sending a request for rewriting the use limitation information of distribution data which is stored in the information receiving device with respect to the distribution device, and rewriting the use limitation information of the stored distribution data when obtaining permission to do so from the distribution device.

With this information receiving program, the distribution data containing the contents data provided by the information source provider further contains the use limitation information of the distribution data, a request for rewriting the use limitation information of the distribution data stored in the receiving section is sent to the distribution device, and the use limitation information of the distribution data is rewritten when given permission to do so from the distribution device.

In order to modify use limitation information of distribution data stored in a receiving device, it was conventionally required to receive the same distribution data having different use limitation information from a distribution device. In contrast, in the foregoing arrangement, in order to modify the use limitation information of the distribution data stored in the receiving device, it is required to simply obtain permission to do so from the distribution device, thereby making it possible to modify the use limitation information. This enables modification of the use limitation information of the distribution data stored in the receiving device without receiving, again, the distribution data containing contents data which has a relatively large data size, thereby greatly shortening time for distribution and saving data storage capacitance in the receiving device.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An information distribution system which distributes contents data via a communications network, the contents data being provided by an information source provider, comprising:
   a distribution device for distributing distribution data containing the contents data; and
   a receiving device for receiving and storing the distribution data,
   wherein:
   the distribution data further contains use limitation information of the distribution data, and
   the receiving device rewrites the use limitation information of the stored distribution data upon receipt of permission by the distribution device, wherein:
   the receiving device receives from the distribution device a reuse information key indicative of details of changes made in the use limitation information and rewrites use limitation information of the distribution data stored in the receiving device based on the reuse information key.

2. The information distribution system set forth in claim 1, wherein:
   the use limitation information is reproducible count information of the distribution data.

3. The information distribution system set forth in claim 1, wherein the use limitation information is usable environment information of the distribution data.

4. The information distribution system set forth in claim 1, wherein: the receiving device is a PC which is connected to the Internet.

5. The information distribution system set forth in claim 1, wherein:
   when the distribution device receives from the receiving device a request for rewriting use limitation information of distribution data, the distribution device judges whether or not the distribution device is authorized to give permission to rewrite the use limitation information of the distribution data.

6. The information distribution system set forth in claim 5, wherein:
   when rewriting of the use limitation information of distribution data cannot be permitted as a result of judgment by the distribution device, the distribution device sends information showing refusal of the request for rewriting the use limitation information of the distribution data with respect to the receiving device.

7. The information distribution system set forth in claim 6, wherein:

when rewriting of the use limitation information of distribution data cannot be permitted as a result of judgment by the distribution device, the distribution device transfers the request for rewriting the use limitation information of the distribution data to a different distribution device.

8. The information distribution system set forth in claim 1, wherein:

when the distribution device receives from the receiving device a request for rewriting use limitation information of distribution data, the distribution device judges whether or not the receiving device has right to receive permission to rewrite the use limitation information of the distribution data.

9. The information distribution system set forth in claim 1, wherein:

the use limitation information of the distribution data is contained in the distribution data by electronic watermarking.

10. An information distribution device, which is connected to a communications network and distributes distribution data containing contents data which is provided by an information source provider with respect to a receiving device, wherein:

the distribution data further contains use limitation information of the distribution data, the device comprising:

a reuse request information receiving section for receiving from the receiving device a request for rewriting use limitation information of the distribution data stored in the receiving device; and a reuse permission section for giving permission to rewrite the use limitation information of the distribution data stored in the receiving device, wherein:

the reuse permission section sends a reuse information key indicative of details of changes made in the use limitation information with respect to the receiving device, and the receiving device rewrites the use limitation information of the distribution data stored in the receiving device based on the reuse information key.

11. The information distribution device set forth in claim 10, wherein: the use limitation information is reproducible count information of the distribution data.

12. The information distribution device set forth in claim 10, wherein: the use limitation information is usable environment information of the distribution data.

13. The information distribution device set forth in claim 10, further comprising:

a reuse permission section which, when the reuse request information receiving section receives from the receiving device a request for rewriting use limitation information of distribution data, judges whether or not the distribution device is authorized to give permission to rewrite the limitation information of the distribution data.

14. The information distribution device set forth in claim 10, wherein:

when the reuse request information receiving section receives from the receiving device a request for rewriting use limitation information of distribution data, the reuse permission section judges whether the receiving device has right to receive permission to rewrite the use limitation information of the distribution data.

15. The information distribution device set forth in claim 10, wherein:

the use limitation information of the distribution data is contained in the distribution data by electronic watermarking.

16. An information receiving device, which is connected to a communications network and receives from a distribution device distribution data containing contents data which is provided by an information source provider, wherein:

the distribution data further contains use limitation information of the distribution data, the device comprising:

an order placing section for sending a request for rewriting use limitation information of distribution data which is stored in the information receiving device with respect to the distribution device; and a reuse setting section for rewriting the use limitation information of the stored distribution data when obtaining permission to rewrite the use limitation information of the distribution data from the distribution device, wherein the reuse setting section receives from the distribution device a reuse information key indicative of details of changes made in the use limitation information and rewrites the use limitation information of the distribution data based on the reuse information key.

17. The information receiving device set forth in claim 16, wherein: the use limitation information is reproducible count information of the distribution data.

18. The information receiving device set forth in claim 16, wherein: the use limitation information is usable environment information of the distribution data.

19. The information receiving device set forth in claim 16, which is made up of a PC connected to the Internet.

20. The information receiving device set forth in claim 16, wherein:

the use limitation information of the distribution data is contained in the distribution data by electronic watermarking.

21. An information distribution method, which is connected to a communications network and distributes distribution data containing contents data from a distribution device to receiving devices, the contents data being provided by an information source provider, the method wherein the distribution data further contains use limitation information of the distribution data, the method comprising the steps of:

receiving from the receiving device a request for rewriting the use limitation information of distribution data which is stored in the receiving device;

giving permission to rewrite the use limitation information of the distribution data stored in the receiving device;

providing a reuse information key indicating a change in the use limitation information being supplied to the receiving device; and the receiving device rewriting the use limitation information of the distribution area stored in the receiving device reference to the reuse information key.

22. A computer readable recording medium storing a program that is executed by a computer to perform an information distribution program, which is connected to a communications network and distributes distribution data containing contents data from a distribution device to receiving devices, the contents data being provided by an information source provider, the program wherein:

the distribution data further contains use limitation information of the distribution data, and the program using a computer to execute the processes of:

receiving from the receiving device a request for rewriting the use limitation information of distribution data which is stored in the receiving device; and giving permission to rewrite the use limitation information of the distribution data stored in the receiving device, providing a reuse information key indicating a change in the use limitation information being supplied to the receiving device; and the receiving device rewriting the use limitation information of the distribution area stored in the receiving device reference to the reuse information key.

23. A recording medium having the information distribution program of claim 22 recorded therein.

24. An information receiving method, which is connected to a communications network and receives distribution data containing contents data from a distribution device, the contents data being provided by an information source provider, the method wherein the distribution data further contains use limitation information of the distribution data, the method comprising the steps of:

sending a request for rewriting use limitation information of distribution data which is stored in the information receiving device with respect to the distribution device, rewriting the use limitation information of the stored distribution data when obtaining permission to do so from the distribution device, providing a reuse information key indicating a change in the use limitation information being supplied to the receiving device, and the receiving device rewriting the use limitation information of the distribution area stored in the receiving device reference to the reuse information key.

25. A computer readable recording medium storing a program that is executed by a computer to perform an information receiving program, which is connected to a communications network and receives from a distribution device distribution data containing contents data provided by an information source provider, the program wherein the distribution data further contains use limitation information of the distribution data, the program using a computer to execute the processes of:

sending a request for rewriting the use limitation information of distribution data which is stored in the information receiving device with respect to the distribution device;

rewriting the use limitation information of the stored distribution data when obtaining permission to do so from the distribution device;

providing a reuse information key indicating a change in the use limitation information being supplied to the receiving device and the receiving device rewriting the use limitation information of the distribution area stored in the receiving device reference to the reuse information key.

26. A recording medium having the information receiving program of claim 25 recorded therein.

* * * * *